US012776809B2

(12) United States Patent
Ma et al.

(10) Patent No.: US 12,776,809 B2
(45) Date of Patent: Oct. 27, 2026

(54) GRADUAL FREQUENCY ADJUSTMENT FOR DUAL-LOOP FREQUENCY CONTROL IN NTN BASED ON USER EQUIPMENT REQUIREMENTS

(71) Applicant: QUALCOMM Incorporated, San Diego, CA (US)

(72) Inventors: Liangping Ma, San Diego, CA (US); Changhwan Park, San Diego, CA (US); Xiao Feng Wang, San Diego, CA (US); Mohamad Sayed Hassan, Paris (FR); Jun Ma, San Diego, CA (US); Umesh Phuyal, San Diego, CA (US); Peter Gaal, San Diego, CA (US); Huilin Xu, Temecula, CA (US); Harikumar Krishnamurthy, San Diego, CA (US); Bharat Shrestha, San Diego, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 17/937,302

(22) Filed: Sep. 30, 2022

(65) Prior Publication Data

US 2023/0336212 A1 Oct. 19, 2023

Related U.S. Application Data

(60) Provisional application No. 63/363,138, filed on Apr. 18, 2022.

(51) Int. Cl.

| | |
|---|---|
| ***H04B 7/01*** | (2006.01) |
| ***H04W 64/00*** | (2009.01) |
| ***H04W 84/06*** | (2009.01) |

(52) U.S. Cl.
CPC ............ *H04B 7/01* (2013.01); *H04W 64/006* (2013.01); *H04W 84/06* (2013.01)

(58) Field of Classification Search
CPC ...... H04B 7/01; H04W 64/006; H04W 84/06; H04W 64/00; H04W 28/0226
See application file for complete search history.

(56) References Cited

U.S. PATENT DOCUMENTS 10,862,577 B2 12/2020 Alasti et al.
2021/0328659 A1* 10/2021 Luo .................... H04B 7/18513

(Continued)

OTHER PUBLICATIONS

Huawei., et al., "Discussion on UL Time and Frequency Synchronization Enhancement for NTN", 3GPP TSG RAN WG1 Meeting #104bis-e, R1-2102342, 3rd Generation Partnership Project (3GPP), Mobile Competence Centre, 650, Route Des Lucioles, F-06921, Sophia-Antipolis Cedex, France, vol. RAN WG1, No. E-meeting, Apr. 12, 2021-Apr. 20, 2021, Apr. 7, 2021, 11 Pages, XP052177062, Sections 1-3, Figure 6.

(Continued)

*Primary Examiner* — Kwang B Yao
*Assistant Examiner* — Patrick Yipao Pei
(74) *Attorney, Agent, or Firm* — Procopio, Cory, Hargreaves & Savitch LLP

(57) ABSTRACT

In an aspect of the disclosure, a method, a computer-readable medium, and an apparatus at a UE in NTN are provided. The UE may be configured to receive one or more FPC commands from an NTN. The UE may be further configured to transmit, in response to receiving the one or more FPC commands, an uplink transmission with a frequency change having a total FPC adjustment calculated based on (a) a current UE location update and a current UE velocity update, wherein the total FPC adjustment satisfies one or more threshold requirements, or (b) an intermediary UE location update between the current UE location update (Continued)

and a previous UE location update and an intermediary UE velocity update between the current UE velocity update and a previous UE velocity update.

29 Claims, 18 Drawing Sheets

(56) References Cited

U.S. PATENT DOCUMENTS

2022/0386259 A1* 12/2022 Chen .................. H04B 7/18563
2023/0054715 A1* 2/2023 Li ......................... H04B 7/1855
2023/0254851 A1* 8/2023 Prasad .............. H04W 72/1268 370/316
2023/0388952 A1* 11/2023 Khoshkholgh Dashtaki ............... H04B 7/18513
2024/0422708 A1* 12/2024 Ernström ............ H04W 56/004

OTHER PUBLICATIONS

Huawei., et al., "Discussion on UL Time and Frequency Synchronization Enhancement for NTN", 3GPP TSG RAN WG1 Meeting #105-e, R1-2104256, 3rd Generation Partnership Project (3GPP), Mobile Competence Centre, 650, Route Des Lucioles, F-06921, Sophia-Antipolis Cedex, France, vol. RAN WG1, No. E-meeting, May 10, 2021-May 27, 2021, May 12, 2021, 10 Pages, XP052010710, Sections 1-3, Figure 6.

International Search Report and Written Opinion—PCT/US2023/015011—ISA/EPO—May 31, 2023.

* cited by examiner

UE does not move, but scatter prevents LoS path to UE, requiring reflector

1000

FPC_p - the amount of FPC applied in the most recent previous uplink transmission at slot N-1

FPC_h - the amount of FPC that would have been applied at slot N if the L/V update between N-1 and N did not occur FPC_c - the amount of FPC derived based on most recent L/V update at slot N ΔT# - gradually incremented FPC

1100

FPC_p1 - the amount of FPC applied in the previous uplink transmission at slot N-1

FPC_h1 - the amount of FPC that would have been applied at slot N if L/V update 1 did not occur FPC_c1 - the amount of FPC derived based on L/V update 1 at slot N FPC_c2 - the amount of FPC that would have been applied at slot N+2 if L/V update 2 did not occur FPC_s2 - the amount of FPC derived based on L/V update 2 at slot N+2

ΔT# - gradually incremented FPC

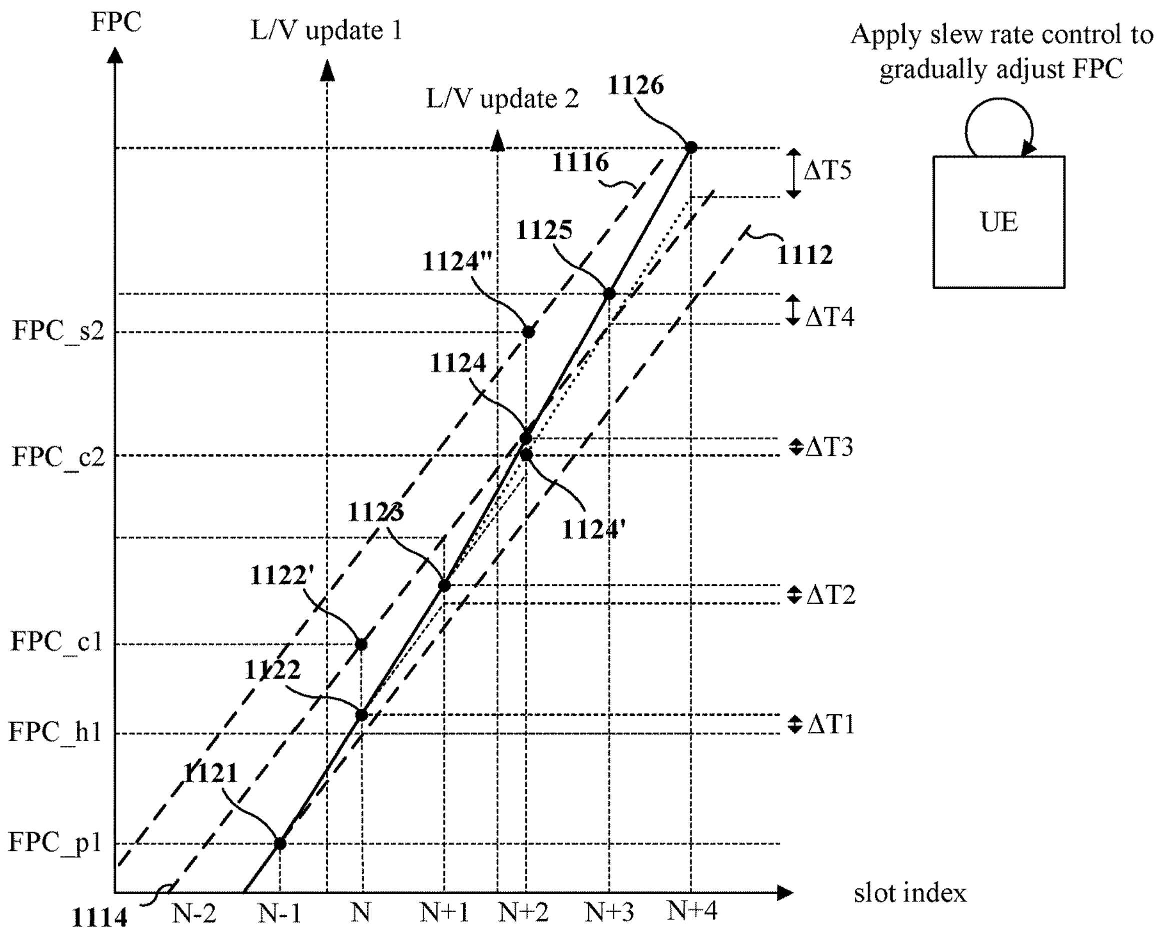

FIG. 11

GRADUAL FREQUENCY ADJUSTMENT FOR DUAL-LOOP FREQUENCY CONTROL IN NTN BASED ON USER EQUIPMENT REQUIREMENTS

CROSS REFERENCE TO RELATED APPLICATION(S)

This application claims the benefit of and priority to U.S. Provisional Application Ser. No. 63/363,138, entitled "GRADUAL FREQUENCY ADJUSTMENT FOR DUAL-LOOP FREQUENCY CONTROL IN NTN BASED ON USER EQUIPMENT REQUIREMENTS" and filed on Apr. 18, 2022, which is expressly incorporated by reference herein in its entirety.

TECHNICAL FIELD

The present disclosure relates generally to communication systems, and more particularly, to wireless communication systems with a non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive one or more frequency pre-compensation (FPC) commands from an non-terrestrial network (NTN). The at least one processor may be further configured to transmit, in response to receiving the one or more FPC commands, an uplink transmission with a frequency change having a total FPC adjustment calculated based on (a) a current UE location update and a current UE velocity update, where the total FPC adjustment satisfies one or more threshold requirements, or (b) an intermediary UE location update between the current UE location update and a previous UE location update and an intermediary UE velocity update between the current UE velocity update and a previous UE velocity update.

In an aspect of the disclosure, a method, a computer-readable medium, and an apparatus at a non-terrestrial network (NTN) node are provided. The apparatus may include a memory and at least one processor coupled to the memory. The memory and the at least one processor coupled to the memory may be configured to transmit one or more FPC commands to a UE. The memory and the at least one processor coupled to the memory may be configured to receive, in response to transmitting the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update.

To the accomplishment of the foregoing and related ends, the one or more aspects includes the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 shows a graph illustrating different gradual adjustments for an FPC over time, in accordance with various aspects of the present disclosure.

DETAILED DESCRIPTION

Figure 1:
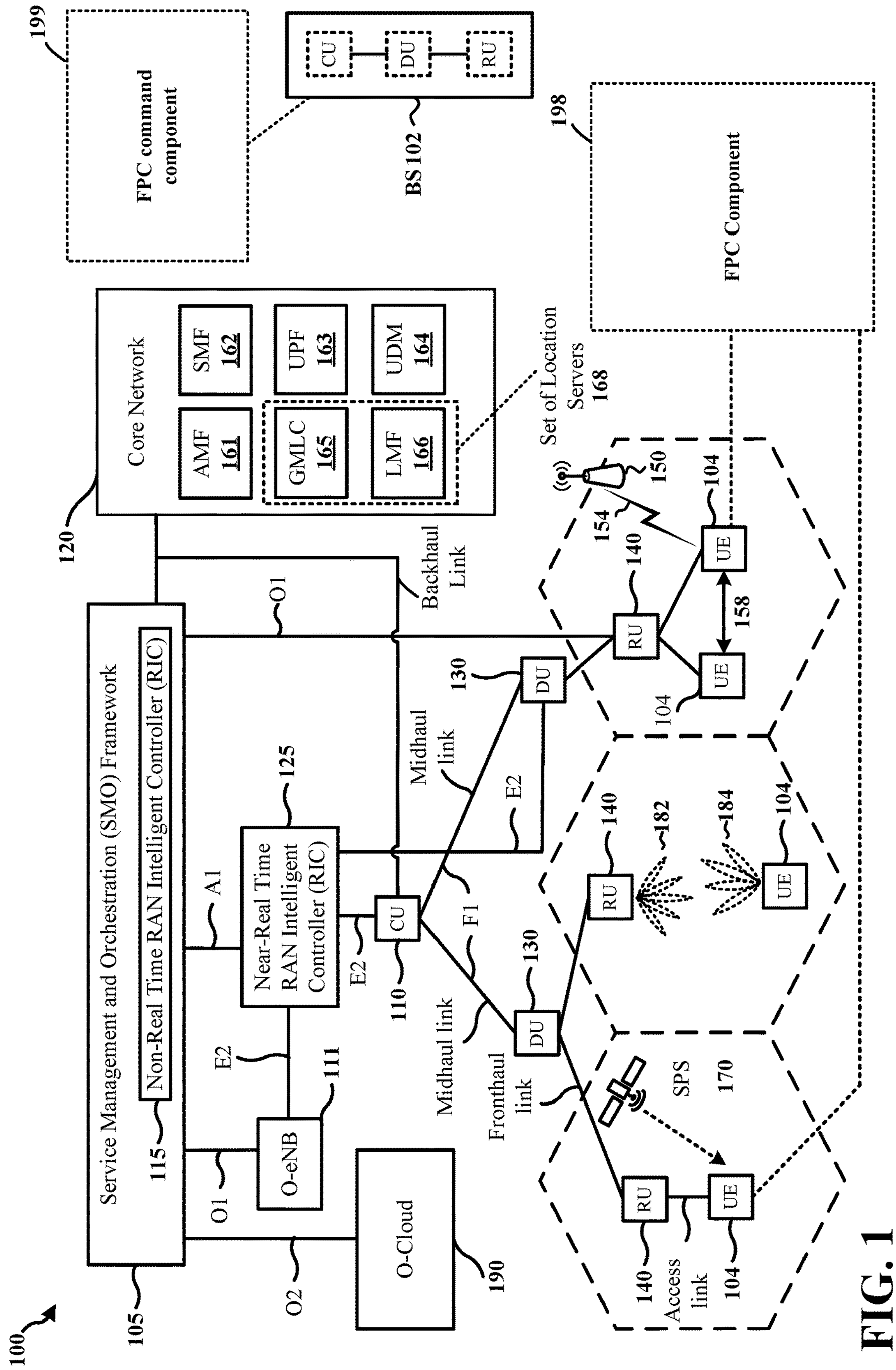
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, a Node B, an eNB, an access point, a base transceiver station, a radio base station, a radio transceiver, a transceiver function, a basic service set (BSS), an extended service set (ESS), a transmit reception point (TRP), a network node, an NTN node, a network entity, a network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some aspects, the base station 102 may communicate with the UE 104 via an NTN device having an RU 140, such as a satellite or an airplane. In some aspects, the NTN device may be a transparent satellite that performs one or more of amplification, filtering, and frequency conversion. In some aspects where the NTN device is a transparent satellite, the NTN device may receive signals from the base station 102 and relay, such as by performing amplify-and-forward relay, the signal to one or more UEs 104. The NTN device may also receive signals from one or more UEs 104 and relay, such as by performing amplify- and forward relay, the signal to the base station 102. In some aspects, the NTN device may also convert the carrier frequency between the input/received signal and the output/transmitted signal. The communication link between the NTN device and the base station 102 may be referred to as a feeder link. In some aspects, the NTN device may be a non-transparent satellite that may be capable of performing one or more aspects performed by the base station 102. In some aspects, the NTN device may be a base station and may be connected to the core network 120.

Referring again to FIG. 1, in certain aspects, the UE 104 may have an FPC component 198 configured to transmit, in response to receiving one or more FPC commands from an NTN, an uplink transmission with a gradual frequency adjustment to minimize the effects of a possible dual-loop correction. The FPC component 198 may be configured to receive one or more FPC commands from the NTN node. The FPC component 198 may be configured to transmit, in response to receiving the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update. In certain aspects, the base station 102 may be an NTN node. The base station 102 may have an FPC command component 199 configured to transmit one or more FPC commands to a UE. The FPC command component 199 may be configured to receive, in response to transmitting the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update. Although the following description may be focused on NTN systems, the concepts described herein may be applicable to other similar areas, such as systems where a UE and a base station transceiver rapidly change their location and velocity relative to one another. Although the following description may be focused on 5G NR, the concepts described herein may be applicable to other similar areas, such as LTE, LTE-A, CDMA, GSM, and other wireless technologies.

Figure 2B:
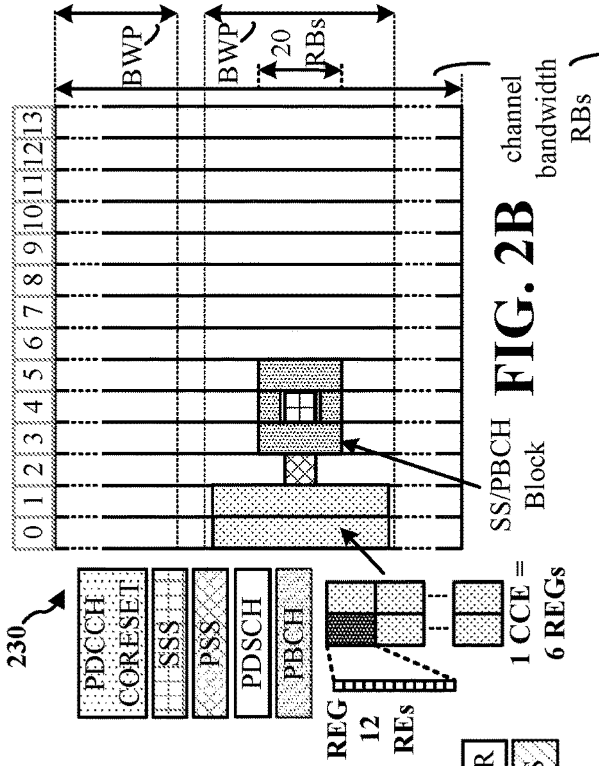
FIG. 2B is a diagram illustrating an example of DL channels within a subframe, in accordance with various aspects of the present disclosure.
Figure 2A:
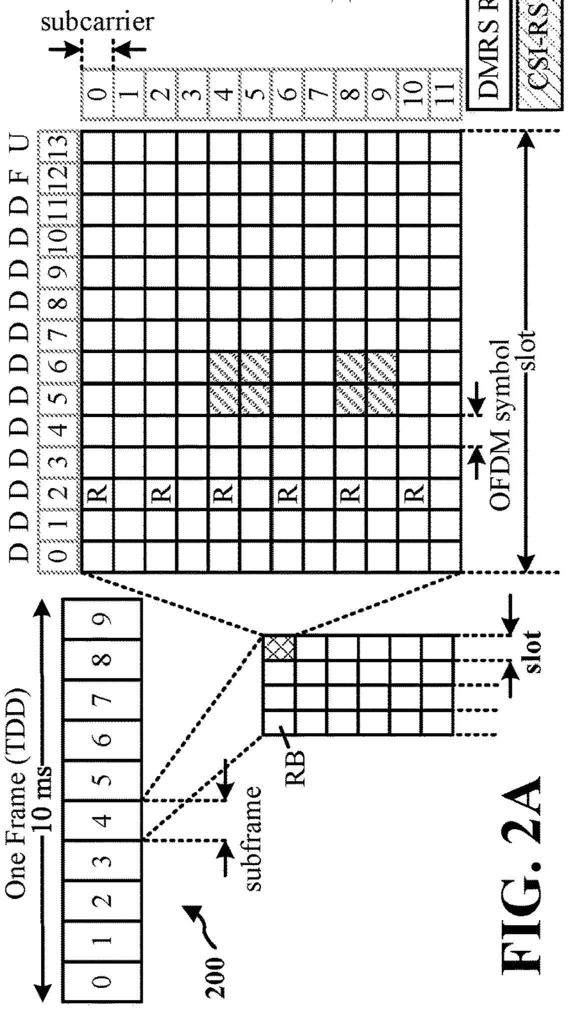
FIG. 2A is a diagram illustrating an example of a first frame, in accordance with various aspects of the present disclosure.
Figure 2D:
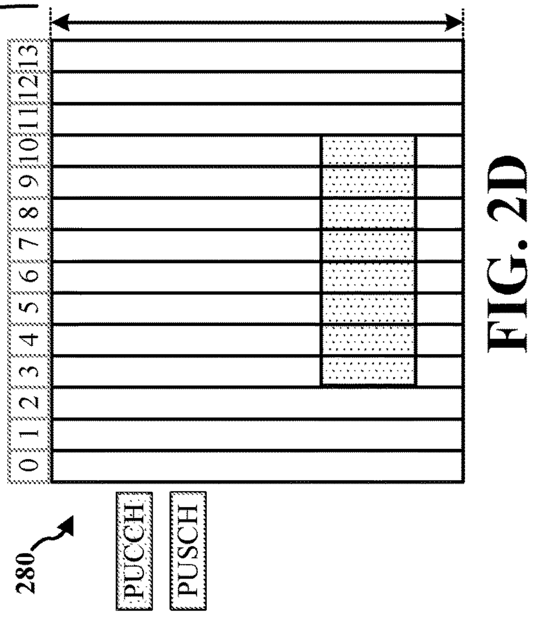
FIG. 2D is a diagram illustrating an example of UL channels within a subframe, in accordance with various aspects of the present disclosure.
Figure 2C:
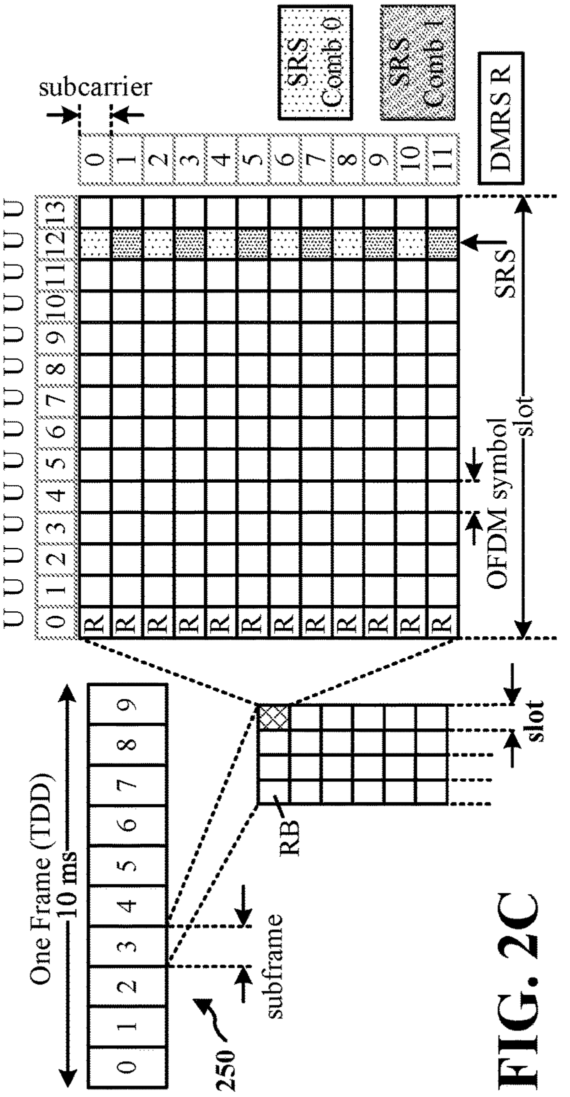
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
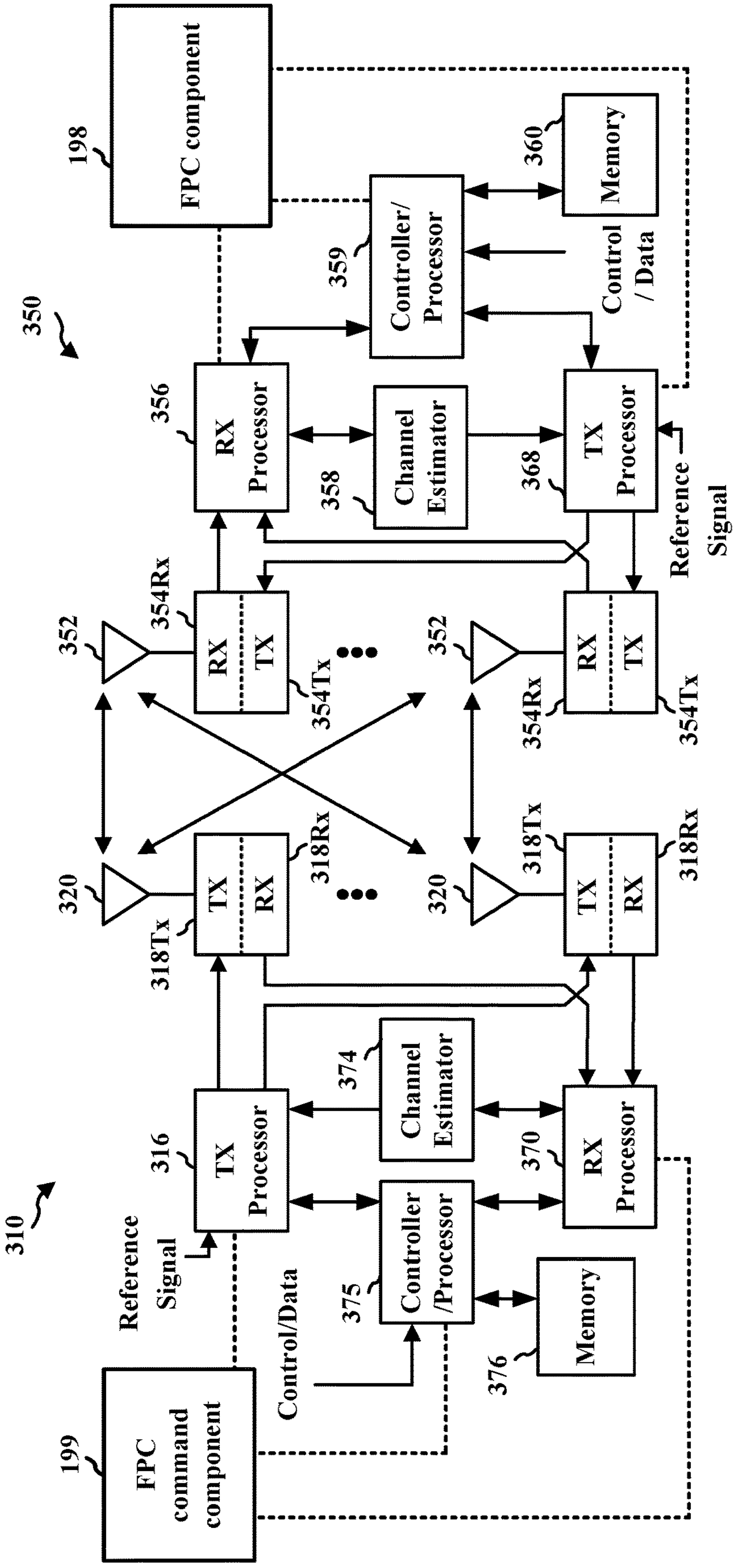
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the FPC component 198 of FIG. 1.

At least one of the Tx processor 316, the Rx processor 370, and the controller/processor 375 may be configured to perform aspects in connection with the FPC command component 199 of FIG. 1.

Figure 4A:
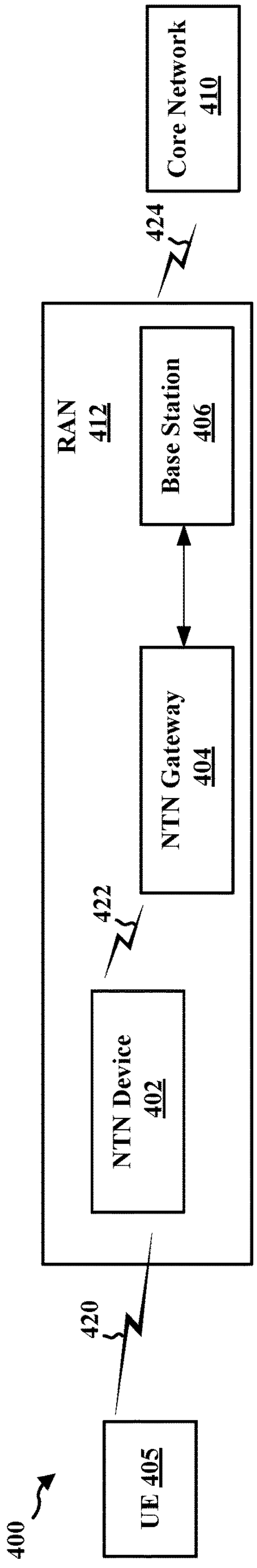
FIGS. 4A, 4B, and 4C illustrate example aspects of a network architecture that supports communication via an NTN device, in accordance with various aspects of the present disclosure.

FIG. 4A provides a generalized illustration of various components, any or all of which may be utilized as appropriate, and each of which may be duplicated or omitted, as necessary. Specifically, although the example of FIG. 4A includes one UE 405, many UEs (e.g., hundreds, thousands, millions, etc.) may utilize the network architecture 400. Similarly, the network architecture 400 may include a larger (or smaller) number of NTN devices, NTN gateways, base stations, RAN, core networks, and/or other components. The illustrated connections that connect the various components in the network architecture 400 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 405 may be configured to communicate with the core network 410 via the NTN device 402, the NTN gateway 404, and the base station 406. As illustrated by the RAN 412, one or more RANs associated with the core network 410 may include one or more base stations. Access to the network may be provided to the UE 405 via wireless communication between the UE 405 and the base station 406 (e.g., a serving base station), via the NTN device 402 and the NTN gateway 404. The base station 406 may provide wireless communications access to the core network 410 on behalf of the UE 405, e.g., using 5G NR.

The base station 406 may be referred to by other names such as a network entity, a gNB, a base station, a network node, a "satellite node", a satellite NodeB (sNB), "satellite access node", etc. The base station 406 may not be the same as terrestrial network gNBs, but may be based on a terrestrial network gNB with additional capability. For example, the base station 406 may terminate the radio interface and associated radio interface protocols to the UE 405 and may transmit DL signals to the UE 405 and receive UL signals from the UE 405 via the NTN device 402 and the NTN gateway 404. The base station 406 may also support signaling connections and voice and data bearers to the UE 405 and may support handover of the UE 405 between different radio cells for the NTN device 402, between different NTN devices and/or between different base stations. The base station 406 may be configured to manage moving radio beams (e.g., for airborne vehicles and/or non-geostationary (non-GEO) devices) and associated mobility of the UE 405. The base station 406 may assist in the handover (or transfer) of the NTN device 402 between different NTN gateways or different base stations. In some examples, the base station 406 may be separate from the NTN gateway 404, e.g., as illustrated in the example of FIG. 4A. In other examples, the base station 406 may include or may be combined with one or more NTN gateways, e.g., using a split architecture. For example, with a split architecture, the base station 406 may include a Central Unit (CU), such as the example CU 110 of FIG. 1, and the NTN gateway 404 may include or act as Distributed Unit (DU), such as the example DU 130 of FIG. 1. The base station 406 may be fixed on the ground with transparent payload operation. In one implementation, the base station 406 may be physically combined with, or physically connected to, the NTN gateway 404 to reduce complexity and cost.

The NTN gateway 404 may be shared by more than one base station and may communicate with the UE 405 via the NTN device 402. The NTN gateway 404 may be dedicated to one associated constellation of NTN devices. The NTN gateway 404 may be included within the base station 406, e.g., as a base station-DU within the base station 406. The NTN gateway 404 may communicate with the NTN device 402 using control and user plane protocols. The control and user plane protocols between the NTN gateway 404 and the NTN device 402 may: (i) establish and release the NTN gateway 404 to the NTN device 402 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 402 or radio cell to another NTN gateway.

Support of transparent payloads with the network architecture 400 shown in FIG. 4A may impact the communication system as follows. The core network 410 may treat a satellite RAT as a new type of RAT with longer delay, reduced bandwidth and/or higher error rate. Consequently, there may be some impact to PDU session establishment and mobility management (MM) and connection management (CM) procedures. The NTN device 402 may be shared with other services (e.g., satellite television, fixed Internet access) with 5G NR mobile access for UEs added in a transparent manner. This may enable legacy NTN devices to be used and may avoid deploying a new type of NTN device. The base station 406 may assist assignment and transfer of the NTN device 402 and radio cells between the base station 406 and the NTN gateway 404 and support handover of the UE 405 between radio cells, NTN devices, and other base stations. Thus, the base station 406 may differ from a terrestrial network gNB. Additionally, a coverage area of the base station 406 may be much larger than the coverage area of a terrestrial network base station.

In the illustrated example of FIG. 4A, a service link 420 may facilitate communication between the UE 405 and the NTN device 402, a feeder link 422 may facilitate communication between the NTN device 402 and the NTN gateway 404, and an interface 424 may facilitate communication between the base station 406 and the core network 410. The service link 420 and the feeder link 422 may be implemented by a same radio interface (e.g., the NR-Uu interface). The interface 424 may be implemented by the NG interface.

Figure 4B:
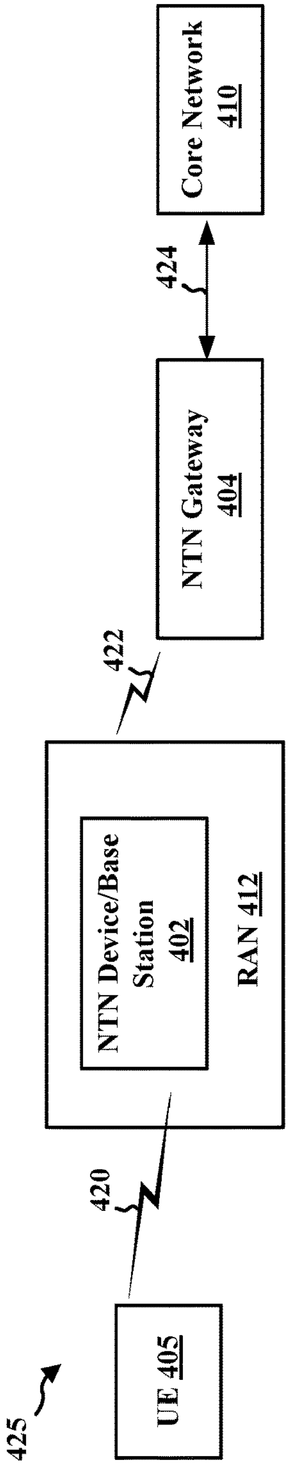

FIG. 4B shows a diagram of a network architecture 425 capable of supporting NTN access, e.g., using 5G NR, as presented herein. The network architecture 425 shown in FIG. 4B is similar to that shown in FIG. 4A, like designated elements being similar or the same. FIG. 4B, however, illustrates a network architecture with regenerative payloads, as opposed to transparent payloads shown in FIG. 4A. A regenerative payload, unlike a transparent payload, includes an on-board base station (e.g., includes the functional capability of a base station), and is referred to herein as an NTN device 402/base station. The on-board base station may be a network node that corresponds to the base station 310 in FIG. 3. The RAN 412 is illustrated as including the NTN device 402/base station. Reference to the NTN device 402/base station may refer to functions related to communication with the UE 405 and the core network 410 and/or to functions related to communication with the NTN gateway 404 and with the UE 405 at a physical radio frequency level.

An on-board base station may perform many of the same functions as the base station 406 as described previously. For example, the NTN device 402/base station may terminate the radio interface and associated radio interface protocols to the UE 405 and may transmit DL signals to the UE 405 and receive UL signals from the UE 405, which may include encoding and modulation of transmitted signals and demodulation and decoding of received signals. The NTN device 402/base station may also support signaling connections and voice and data bearers to the UE 405 and may support handover of the UE 405 between different radio cells for the NTN device 402/base station and between or among different NTN device/base stations. The NTN device 402/base station may assist in the handover (or transfer) of the UE 405 between different NTN gateways and different control networks. The NTN device 402/base station may hide or obscure specific aspects of the NTN device 402/base station from the core network 410, e.g., by interfacing to the core network 410 in the same way or in a similar way to a terrestrial network base station. The NTN device 402/base station may further assist in sharing of the NTN device 402/base station. The NTN device 402/base station may communicate with one or more NTN gateways and with one or more core networks via the NTN gateway 404. In some aspects, the NTN device 402/base station may communicate directly with other NTN device/base stations using Inter-Satellite Links (ISLs), which may support an Xn interface between any pair of NTN device/base stations.

With low Earth orbit (LEO) devices, the NTN device 402/base station may manage moving radio cells with coverage at different times. The NTN gateway 404 may be connected directly to the core network 410, as illustrated. The NTN gateway 404 may be shared by multiple core networks, for example, if NTN gateways are limited. In some examples the core network 410 be configured to be aware of coverage area(s) of the NTN device 402/base station in order to page the UE 405 and to manage handover. Thus, as can be seen, the network architecture 425 with regenerative payloads may have more impact and complexity with respect to both the NTN device 402/base station and the core network 410 than the network architecture 400 including transparent payloads, as shown in FIG. 4A.

Support of regenerative payloads with the network architecture 425 shown in FIG. 4B may impact the network architecture 425 as follows. The core network 410 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 405). If fixed tracking areas and fixed cells are supported, the core network 410 may map any fixed tracking area to one or more NTN device/base stations with current radio coverage of the fixed tracking area when performing paging of the UE 405 that is located in this fixed tracking area. This could include configuration in the core network 410 of long term orbital data for the NTN device 402/base station (e.g., obtained from an operator of the NTN device 402/base station) and could add significant new impact to core network 410.

In the illustrated example of FIG. 4B, a service link 420 may facilitate communication between the UE 405 and the NTN device 402/base station, a feeder link 422 may facilitate communication between the NTN device 402/base station and the NTN gateway 404, and an interface 424 may facilitate communication between the NTN gateway 404 and the core network 410. The service link 420 may be implemented by the NR-Uu interface. The feeder link 422 may be implemented by the NG interface over SRI. The interface 424 may be implemented by the NG interface.

Figure 4C:
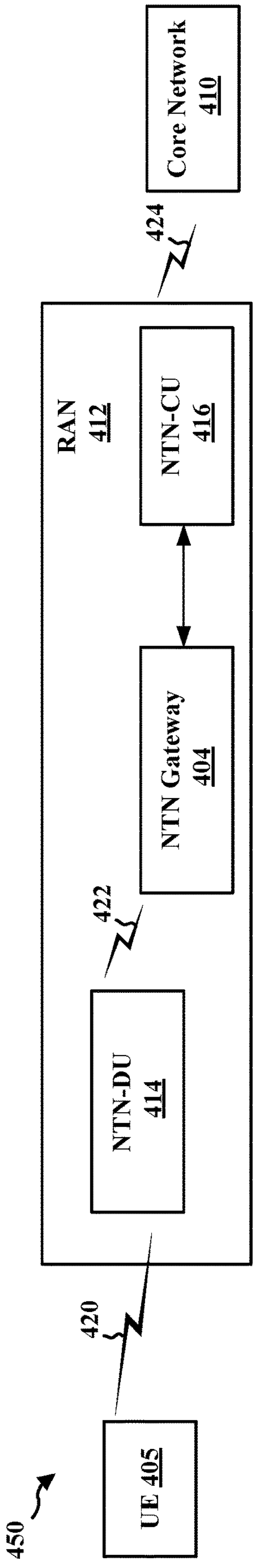

FIG. 4C shows a diagram of a network architecture 450 capable of supporting NTN access, e.g., using 5G NR, as presented herein. The network architecture shown in FIG. 4C is similar to that shown in FIGS. 4A and 4B, like designated elements being similar or the same. FIG. 4C, however, illustrates a network architecture with regenerative payloads, as opposed to transparent payloads, as shown in FIG. 4A, and with a split architecture for the base station. For example, the base station may be split between a Central Unit (CU), such as the CU 110 of FIG. 1, and a Distributed Unit (DU), such as the DU 130 of FIG. 1. In the illustrated example of FIG. 4C, the network architecture 450 includes an NTN-CU 416, which may be a ground-based base station or a terrestrial base station. The regenerative payloads include an on-board base station DU, and is referred to herein as an NTN-DU 414. The NTN-CU 416 and the NTN-DU 414, collectively or individually, may correspond to the network node associated with the base station 310 in FIG. 3.

The NTN-DU 414 communicates with the NTN-CU 416 via the NTN gateway 404. The NTN-CU 416 together with the NTN-DU 414 perform functions, and may use internal communication protocols, which are similar to or the same as a gNB with a split architecture. In the example, the NTN-DU 414 may correspond to and perform functions similar to or the same as a gNB Distributed Unit (gNB-DU), while the NTN-CU 416 may correspond to and perform functions similar to or the same as a gNB Central Unit (gNB-CU). However, the NTN-CU 416 and the NTN-DU 414 may each include additional capability to support the UE 405 access using NTN devices.

The NTN-DU 414 and the NTN-CU 416 may communicate with one another using an F1 Application Protocol (F1AP), and together may perform some or all of the same functions as the base station 406 or the NTN device 402/base station as described in connection with FIGS. 4B and 4C, respectively.

The NTN-DU 414 may terminate the radio interface and associated lower level radio interface protocols to the UE 405 and may transmit DL signals to the UE 405 and receive UL signals from the UE 405, which may include encoding and modulation of transmitted signals and demodulation and decoding of received signals. The operation of the NTN-DU 414 may be partly controlled by the NTN-CU 416. The NTN-DU 414 may support one or more NR radio cells for the UE 405. The NTN-CU 416 may also be split into separate control plane (CP) (NTN-CU-CP) and user plane (UP) (NTN-CU-UP) portions. The NTN-DU 414 and the NTN-CU 416 may communicate over an F1 interface to (a) support control plane signaling for the UE 405 using IP, Stream Control Transmission Protocol (SCTP) and F1 Application Protocol (F1AP) protocols, and (b) to support user plane data transfer for a UE using IP, User Datagram Protocol (UDP), PDCP, SDAP, GTP-U and NR User Plane Protocol (NRUPP) protocols.

The NTN-CU 416 may communicate with one or more other NTN-CUs and/or with one more other terrestrial base stations using terrestrial links to support an Xn interface between any pair of NTN-CUs and/or between the NTN-CU 416 and any terrestrial base station.

The NTN-DU 414 together with the NTN-CU 416 may: (i) support signaling connections and voice and data bearers to the UE 405; (ii) support handover of the UE 405 between different radio cells for the NTN-DU 414 and between different NTN-DUs; and (iii) assist in the handover (or transfer) of NTN devices between different NTN gateways or different core networks. The NTN-CU 416 may hide or obscure specific aspects of the NTN devices from the core network 410, e.g., by interfacing to the core network 410 in the same way or in a similar way to a terrestrial network base station.

In the network architecture 450 of FIG. 4C, the NTN-DU 414 that communicates with and is accessible from an NTN-CU may change over time with LEO devices. With the split base station architecture, the core network 410 may connect to NTN-CUs that are fixed and that do not change over time, which may reduce difficulty with paging of the UE 405. For example, the core network 410 may be configured to know which NTN-DU is used for paging the UE 405. The network architecture with regenerative payloads with a split base station architecture may thereby reduce the core network 410 impact at the expense of additional impact to the NTN-CU 416.

Support of regenerative payloads with a split base station architecture, as shown in FIG. 4C, may impact the network architecture 450 as follows. The impact to the core network 410 may be limited as for the transparent payloads (e.g., the NTN device 402) discussed above. For example, the core network 410 may treat a satellite RAT in the network architecture 450 as a new type of RAT with longer delay, reduced bandwidth and/or higher error rate. The impact on the NTN-DU 414 may be less than the impact on NTN device/base stations (e.g., the NTN device 402/base station with a non-split architecture), as discussed above in reference to FIG. 4B. The NTN-DU 414 may manage changing association with different (fixed) NTN-CUs. Further, the NTN-DU 414 may manage radio beams and radio cells. The NTN-CU 416 impacts may be similar to the impact of the base station 406 for a network architecture with transparent payloads, as discussed above, except for extra impacts to manage changing associations with different NTN-DUs and reduced impacts to support radio cells and radio beams, which may be transferred to the NTN-DU 414. In some aspects, the NTN device may correspond to a high altitude platform system (HAPS) that serves one or more UEs on the ground.

One or more satellites may be integrated with the terrestrial infrastructure of a wireless communication system. Satellites may refer to Low Earth Orbit (LEO) devices, Medium Earth Orbit (MEO) devices, Geostationary Earth Orbit (GEO) devices, and/or Highly Elliptical Orbit (HEO) devices. A non-terrestrial network (NTN) may refer to a network, or a segment of a network, that uses an airborne or spaceborne vehicle for transmission. An airborne vehicle may refer to High Altitude Platforms (HAPs) including Unmanned Aircraft Systems (UAS).

An NTN may be configured to help to provide wireless communication in un-served or underserved areas to upgrade the performance of terrestrial networks. For example, a communication satellite may provide coverage to a larger geographic region than a TN base station. The NTN may also reinforce service reliability by providing service continuity for UEs or for moving platforms (e.g., passenger vehicles-aircraft, ships, high speed trains, buses). The NTN may also increase service availability, including critical communications. The NTN may also enable network scalability through the provision of efficient multicast/broadcast resources for data delivery towards the network edges or even directly to the user equipment.

Figure 5:
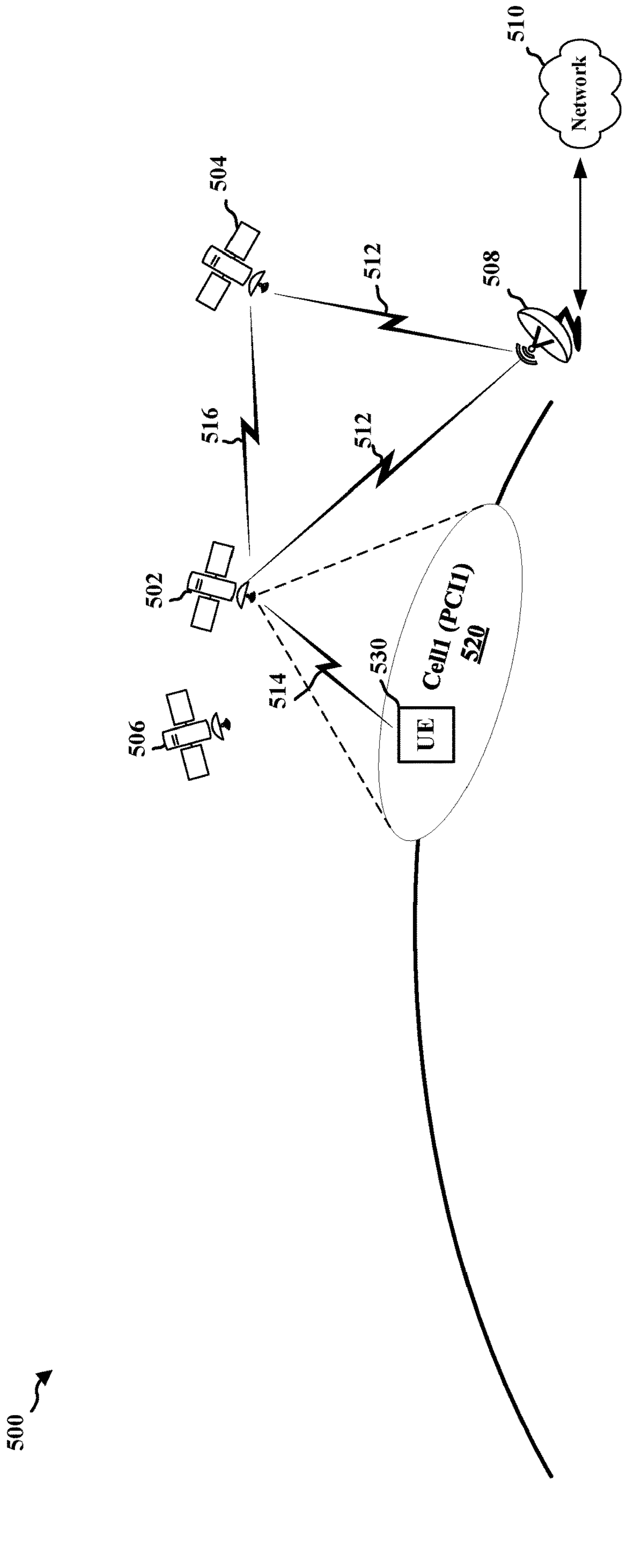
FIG. 5 illustrates an example of an NTN configuration, in accordance with various aspects of the present disclosure.

FIG. 5 illustrates an example of an NTN 500 configuration. An NTN may refer to a network, or a segment of a network, that uses RF resources on-board an NTN platform. The NTN platform may refer to a spaceborne vehicle or an airborne vehicle. Spaceborne vehicles include communication satellites that may be classified based on their orbits. For example, a communication satellite may include a GEO device that appears stationary with respect to the Earth. As such, a single GEO device may provide coverage to a geographic coverage area. In other examples, a communication satellite may include a non-GEO device, such as an LEO device, an MEO device, or an HEO device. Non-GEO devices do not appear stationary with respect to the Earth. As such, a satellite constellation (e.g., one or more satellites) may be configured to provide coverage to the geographic coverage area. An airborne vehicle may refer to a system encompassing Tethered UAS (TUA), Lighter Than Air UAS (LTA), Heavier Than Air UAS (HTA), e.g., in altitudes typically between 8 and 50 km including High Altitude Platforms (HAPs).

In some aspects, the NTN 500 may include an NR-NTN. The example of FIG. 5 provides that the NTN 500 may include a NTN device 502, a NTN device 504, a third NTN device 506, an NTN gateway 508, a data network 510, and a UE 530 within a cell coverage of the NTN device 502. In some aspects, the UE 530 may include IoT devices, and the UE may be connected to the NTN 500 for wireless communication.

The NTN gateway 508 may be one of one or more NTN gateways that may connect the NTN 500 to a public data network. In some examples, the NTN gateway 508 may support functions to forward a signal from the NTN device to a Uu interface, such as an NR-Uu interface. In other examples, the NTN gateway 508 may provide a transport network layer node, and may support transport protocols, such as acting as an IP router. A satellite radio interface (SRI) may provide IP trunk connections between the NTN gateway 508 and the NTN device to transport NG or F1 interfaces, respectively. One or more geosynchronous equatorial orbit (GEO) devices (e.g., which may be referred to herein as the NTN device 502, the NTN device 504, or the third NTN device 506) may be fed by the NTN gateway 508, and the one or more NTN devices may be deployed across the satellite targeted coverage, which may correspond to regional coverage or even continental coverage. A non-GEO device may be served successively by one or more NTN gateways at a time, and the NTN 500 may be configured to provide service and feeder link continuity between the successive serving NTN gateways with time duration to perform mobility anchoring and handover.

The NTN device 502, including spaceborne vehicles or airborne vehicles, may communicate with the data network 510 through a feeder link 512 established between the NTN device 502 and the NTN gateway 508 in order to provide service to the UE 530 within the cell coverage, or a field-of-view of an NTN cell 520, of the NTN device 502 via a service link 514. The feeder link 512 may include a wireless link between an NTN gateway and an NTN device. The service link 514 may refer to a radio link between an NTN device (e.g., the NTN device 502) and the UE 530. As described in connection with FIG. 1, the NTN device 502 may use one or more directional beams, e.g., beamforming, to exchange communication with the UE 530. A beam may refer to a wireless communication beam generated by an antenna on-board an NTN device.

In some examples, the UE 530 may communicate with the NTN device 502 via the service link 514. The NTN device 504 may relay the communication for the NTN device 502 through an inter-satellite link (ISL) 516, and the NTN device 504 may communicate with the data network 510 through the feeder link 512 established between the NTN device 504 and the NTN gateway 508. The ISL links may be provided between a constellation of satellites and may involve the use of transparent payloads on-board the NTN devices. The ISL may operate in an RF frequency or an optical band.

In the illustrated example of FIG. 5, the NTN device 502 may provide the NTN cell 520 with a first physical cell ID (PCI) ("PCI1"). In some examples, a constellation of satellites may provide coverage to the NTN cell 520. For example, the NTN device 502 may include a non-GEO device that does not appear stationary with respect to the Earth. As such, a satellite constellation (e.g., one or more satellites) may be configured to provide coverage to the NTN cell 520. For example, the NTN device 502 and the third NTN device 506 may be part of a satellite constellation that provides coverage to the NTN cell 520.

In some examples, an NTN deployment may provide different services based on the type of payload on-board the NTN device. The type of payload may determine whether the NTN device acts as a relay node or a base station. For example, a transport payload may implement frequency conversion and a radio frequency (RF) amplifier in both uplink (UL) and downlink (DL) directions and may correspond to an analog RF repeater. A transparent payload, for example, may receive UL signals from all served UEs and may redirect the combined signals DL to an earth station without demodulating or decoding the signals. Similarly, a transparent payload may receive an UL signal from an earth station and redirect the signal DL to served UEs without demodulating or decoding the signal. However, the transparent payload may frequency convert received signals and may amplify and/or filter received signals before transmitting the signals.

Wireless communication between a UE and an NTN node may experience frequency phase shift and/or doppler shift when the UE transmits a signal to the NTN node and/or when the NTN node transmits a signal to the UE. The factors that influence doppler shift (for which the UE may calculate an FPC) may include the location change and the velocity change of the UE, and may include the location change and the velocity change of the NTN node. In some aspects, different UEs experience different frequency shifts, and that may cause frequency misalignment of the uplink transmissions from different UEs at the NTN node. Such misalignment, if large enough, may cause interferences among uplink transmissions, e.g., transmissions based on OFDM. The UE may compensate for frequency shift by increasing or decreasing the frequency (i.e., changing the frequency) used by a total FPC adjustment value. The total FPC adjustment value may be calculated as a sum of an open-loop frequency compensation, a closed-loop frequency compensation, and additionally/optionally a constant. In other words, the total FPC adjustment ($F_{FPC\_TOTAL}$) applied by a UE communicating with an NTN may be based on:

$$F_{FPC\_TOTAL}=F_{FPC\_CLOSED}+F_{FPC\_OPEN}+F_{FPC\_OFFSET}$$

$F_{FPC\_CLOSED}$ may include a closed-loop FPC value received from the NTN based on an accumulation of FPC data from the network, such as attributes of UL and DL transmissions with a UE. $F_{FPC\_CLOSED}$ may be equal to zero for PRACH transmissions. $F_{FPC\_CLOSED}$ may be updated based on a FPC command field in Msg2/MsgB and a MAC control element (MAC-CE) FPC value. For example, $F_{FPC\_CLOSED}$ may be set to the MAC-CE FPC value. In another aspect, $F_{FPC\_CLOSED}$ may be updated by adding the FPC value in a FPC MAC CE to a previous $F_{FPC\_CLOSED}$. A UE may be configured to set $F_{FPC\_CLOSED}$ to the MAC-CE FPC value or add the MAC-CE FPC value to a previous $F_{FPC\_CLOSED}$ based on the FPC command field in Msg2/MsgB. The network provided FPC adjustment may be referred to as a closed-loop FPC value. A network entity may provide an $F_{FPC\_CLOSED}$ value to a UE via an NTN device, such as the base station 102 to the UE 104 via the RU 140 of FIG. 1, or NTN gateway 508 to the UE 530 via the NTN device 502.

$F_{FPC\_OPEN}$ may include an open-loop FPC value calculated by the UE. The UE-generated $F_{FPC\_OPEN}$ may be a self-estimated FPC based on the UE's self-estimated location and velocity and the UE's estimated location and velocity of an NTN node, such as a transceiver of the NTN. For example, the variables used to calculate $F_{FPC\_OPEN}$ may include a UE location variable, a UE velocity variable, an NTN node location variable, and an NTN node velocity variable. The location may include x, y, and z axis locations, and velocity may include a vector having x, y, and z axis locations. The UE may estimate the location and velocity of an NTN node using any suitable means, for example by using an ephemeris formula associated with the NTN node. The UE may calculate $F_{FPC\_OPEN}$ based on an estimate of the service link distance and an estimate of the feeder link distance. The UE may self-estimate its location and velocity using any suitable means, for example by executing a location and velocity (L/V) update. An L/V update may be performed, for example, by performing a GNSS fix update to generate an updated location of the UE, and then by comparing the current location of the UE to the last known location of the UE to generate an updated velocity vector of the UE. An L/V update may be include, for example, a GNSS fix update that generates an updated location and velocity of the UE. The UE may estimate the velocity by comparing the current location of the UE to the last known location of the UE or estimate the velocity based on an observed Doppler frequency. The UE may estimate the location and velocity of the NTN node (e.g., in real-time using an ephemeris formula) more often than the UE self-estimates its own location and velocity (e.g., using an L/V update), and thus may calculate $F_{FPC\_OPEN}$ using NTN node location and velocity estimates that are more current than the UE location and velocity estimates. For example, the UE may calculate its $F_{FPC\_OPEN}$ value without first performing an L/V update, which may result in an estimated $F_{FPC\_OPEN}$ value having a frequency change error based on the last known location of the UE instead of a present location of the UE. The $F_{FPC\_CLOSED}$ value may allow a network to feedback and control the frequency error of $F_{FPC\_CLOSED}$. However, when the UE location and velocity estimate is current, the $F_{FPC\_OPEN}$ may now compensate for the frequency error, but the $F_{FPC\_CLOSED}$ may still be compensating for the frequency error, resulting in a double correction issue where both the network and the UE are compensating for the previously incorrect UE location and velocity.

$F_{FPC\_OFFSET}$ may include a fixed frequency offset. The value of $F_{FPC\_OFFSET}$ may be provided by the network, and may be set to zero in some situations. In some aspects, the $F_{FPC\_OFFSET}$ may exist (i.e., $F_{FPC\_TOTAL}=F_{FPC\_CLOSED}+F_{FPC\_OPEN}$ without $F_{FPC\_OFFSET}$), and may be determined by a frequency band of a transmission (e.g., determined via a lookup table that associates offset values with frequency bands). This common offset may be based on a delay at a feeder link, e.g., between a satellite and base station. A network entity may provide an $F_{FPC\_OFFSET}$ value to a UE via an NTN device, such as the base station 102 to the UE 104 in FIG. 1, or NTN gateway 508 to the UE 530 via the NTN device 502 in FIG. 5. In some aspects, $F_{FPC\_OFFSET}$ may be computed by the UE based on a model constructed by the UE using one or more parameters (e.g., coefficients in a Taylor series) signaled by the network. In some aspects, the signaling of the parameters may be via system information.

A UE may calculate the total frequency pre-compensation adjustment value in an idle RRC state (e.g., an "RRC_IDLE" state), an inactive RRC state (e.g., an "RRC_INACTIVE" state), or in an RRC connected state (e.g., an "RRC_CONNECTED" state). A UE may be in a connected state (e.g., an "RRC_CONNECTED" state) or an inactive state (e.g., an "RRC_INACTIVE" state) when the UE has established an RRC connection with a base station. If an RRC connection has not been established, the UE may be considered to be in an idle state (e.g., an "RRC_IDLE" state). While in the idle state, the UE and the base station may establish an RRC connection and the UE may transition to the connected state. While in the connected state, the UE and/or base station may release the RRC connection and the UE may transition to the idle state. In other examples, while in the connected state, the UE and/or the base station may release with suspend the RRC connection and the UE may transition to the inactive state. While in the inactive state, the UE and/or the base station may resume the RRC connection and the UE may transmission to the connected state. In other examples, while in the inactive state, the UE and/or the base station may release the RRC connection and the UE may transition to the idle state.

The base station may provide the UE with an FPC command that indicates for the UE to adjust the frequency of uplink transmissions to compensate for the frequency phase shift. The network may be configured to transmit an FPC command in response to detecting a frequency synchronization error that meets or exceeds a threshold level. Thus, the network may use an FPC command to control uplink signal transmission frequency and/or update the $F_{FPC\_TOTAL}$ value. In some aspects, the FPC command from the network may become outdated. For example, a network may consider an FPC command to be outdated when a time period since the last FPC command was received by the UE has met or exceeded a threshold period of time. In some aspects, the FPC calculation may lead to a double adaptation in which a propagation delay is addressed by both the network controlled FPC (e.g., $F_{FPC\_CLOSED}$) that attempts to mitigate the UE's use of a prior L/V update, which becomes duplicative when the UE performs a new L/V update and updates the self-estimated FPC value $F_{FPC\_OPEN}$. Double adaption may be also called a double correction.

Figure 6:
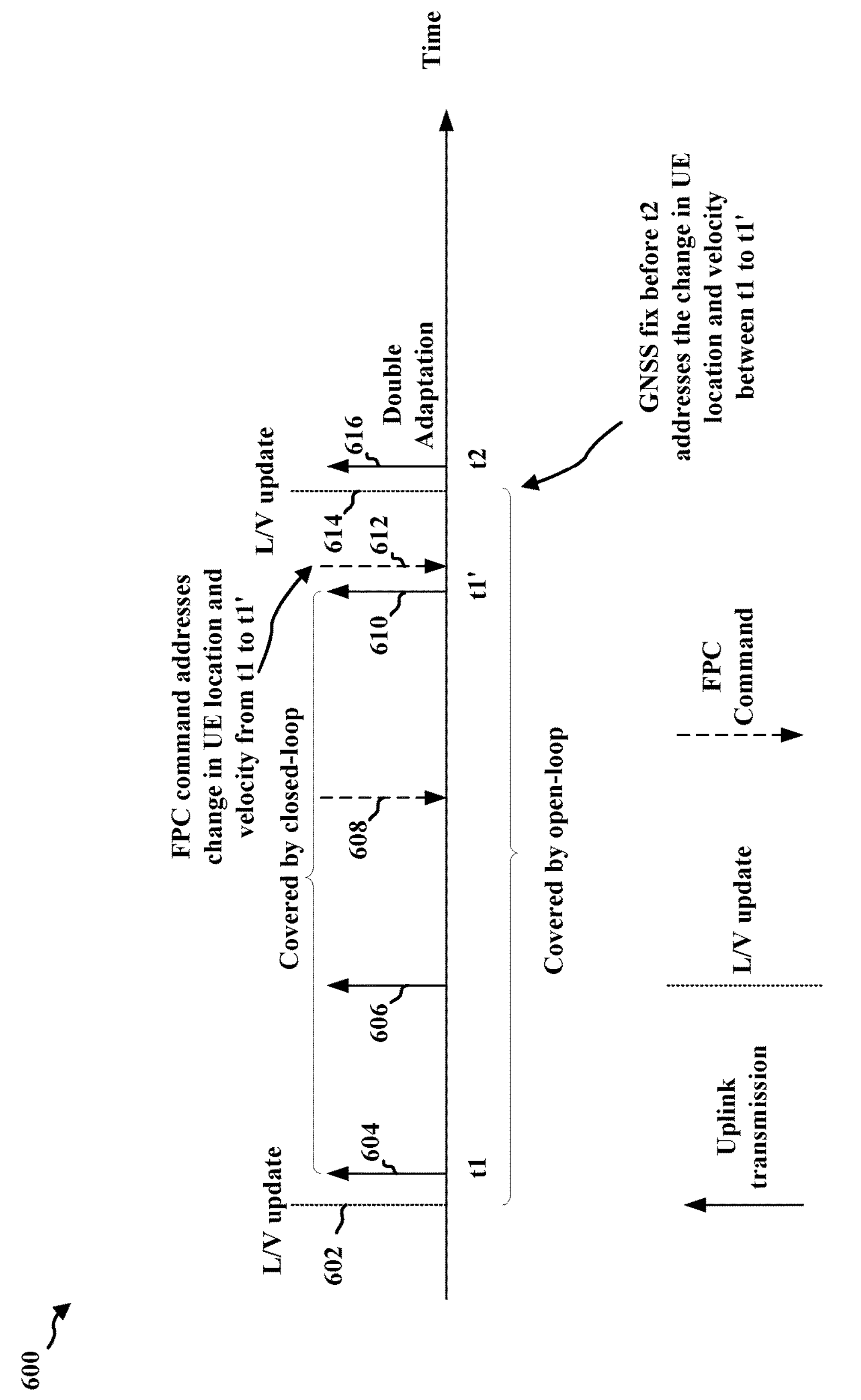
FIG. 6 illustrates a diagram illustrating example aspects of FPC calculation, in accordance with aspects presented herein.

FIG. 6 illustrates a diagram 600 that shows an example of a double adaptation for an FPC adjustment. The UE may be configured to perform an L/V update 602 and use the location and velocity reading resulting from the L/V update and the NTN node location to determine $F_{FPC\_OPEN}$. The UE may transmit an uplink transmission 604 at time t1 and uplink transmission 606 at time t1' based, at least in part, on the $F_{FPC\_OPEN}$ for the L/V update 602. The uplink transmissions 604 and 606 may also have an FPC adjustment value based on accumulated FPC commands (e.g., $F_{FPC\_TOTAL}$). The network may provide the values for $F_{FPC\_CLOSED}$ and $F_{FPC\_OFFSET}$. The network may provide a FPC commands 608 and 612, based on the UE's prior transmissions. For example, the FPC command 608 and/or 612 may be based on a frequency error observed for uplink transmissions 604, 606, or 610 that are based on the L/V update 602. Thus, the FPC commands 608 or 612 may address the movement of the UE relative to the NTN node after the L/V update 602. The UE applies an accumulation of the FPC commands 608, 612, etc. when transmitting uplink transmissions. For example, the uplink transmissions 604 and 606 may have a first value $F_{FPC\_TOTAL1}$, and the uplink transmission 610 may have an accumulated value $F_{FPC\_TOTAL2}$ (FPC command 608 applying an updated $F_{FPC\_CLOSED}$) The uplink transmission 616 may have an accumulated value $F_{FPC\_TOTAL3}$ (for which $F_{FPC\_CLOSED}$ may be based on FPC command 608+FPC command 612). The closed-loop FPC (e.g., $F_{FPC\_CLOSED}$) based on the accumulated FPC commands from the network may provide a FPC that addresses the movement of the UE relative to the NTN node between L/V updates. The UE may perform another L/V update 614, and update the self-estimated FPC (e.g., open-loop FPC value) $F_{FPC\_OPEN}$ based on the UE's location relative to the NTN node based on the L/V update 614. Thus, the self-estimated $F_{FPC\_OPEN}$ may also address the UE's movement between the L/V updates 602 and 614. The addition of the accumulated ($F_{FPC\_CLOSED}$+$F_{FPC\_OPEN}$) may provide for a double adaptation (which may be also called double correction) based on the UE's movement relative to the NTN node. At time t2, when the uplink transmission 616 is transmitted, may be close to time t1' when the uplink transmission 610 is transmitted and may be close to the L/V update 614. The self-estimated FPC ($F_{FPC\_OPEN}$) based on the L/V update 614 may capture the change in location and/or velocity between t1 and t1' in addition to the FPC commands 608, 612 from the network that address the change in location and/or velocity. FIGS. 7A, 7B, 8A, and 8B, illustrate examples of the time periods between L/V updates, FPC from the network, and uplink transmissions.

An NTN deployment may be associated with large Doppler frequency shift relative to a terrestrial network due at least in part to the high relative velocity between the UE and the NTN node. Accordingly, in an NTN, a UE may generally apply an FPC to an uplink transmission performed in an RRC idle or inactive state and/or an uplink transmission performed in an RRC connected state. For example, an FPC applied by a UE may have a value that corresponds to the negation of the Doppler shift between the UE and the NTN node (e.g., satellite) in addition to target uplink frequency. For example, the FPC applied by the UE may correspond to a value based on the Doppler shift between the UE and the NTN node (e.g., satellite) and a received downlink frequency. In this way, the FPC applied by the UE may align uplink reception frequency implemented at the base station to enable communication with different UEs that may be located at various distances from the base station and at different velocities.

In some cases, the UE may self-estimate the open-loop $F_{FPC\_OPEN}$ value based at least in part on a location of the UE and an NTN node location (e.g., a location of the NTN device), where the location of the UE may be estimated based at least in part on a current or most recent L/V update, which the UE may update every few seconds (e.g., in 10 second intervals). The open-loop $F_{FPC\_OPEN}$ value may be an FPC calculation that is not based on feedback, as opposed to a closed-loop $F_{FPC\_CLOSED}$ value calculation. Accordingly, during the interval between L/V updates, the UE location that the UE uses to calculate the UE-specific FPC may be inaccurate (e.g., when the UE is in motion and has not performed an L/V update). In some aspects, the inaccuracy in the UE location used to calculate the $F_{FPC\_OPEN}$ value may be corrected in a closed-loop frequency offset (e.g., a base station may measure the uplink reception frequency error and transmit an FPC command containing an $F_{FPC\_CLOSED}$ value that indicates a closed-loop frequency offset to be used to calculate the overall FPC that the UE is to apply for an uplink transmission). As a result, when the UE calculates a new open-loop $F_{FPC\_OPEN}$ value following an updated L/V update, the new $F_{FPC\_TOTAL}$ value may correct for a change in the UE location twice—once in the $F_{FPC\_CLOSED}$ value and another time in the $F_{FPC\_OPEN}$ value. This may cause a double correction problem, whereby the total FPC adjustment (e.g., $F_{FPC\_TOTAL}$) that the UE applies to an uplink transmission after performing an L/V update is calculated based at least in part on a closed-loop value (e.g., $F_{FPC\_CLOSED}$) and an open-loop value (e.g. $F_{FPC\_OPEN}$) may double-correct for an error in the UE location or velocity.

Figure 7B:
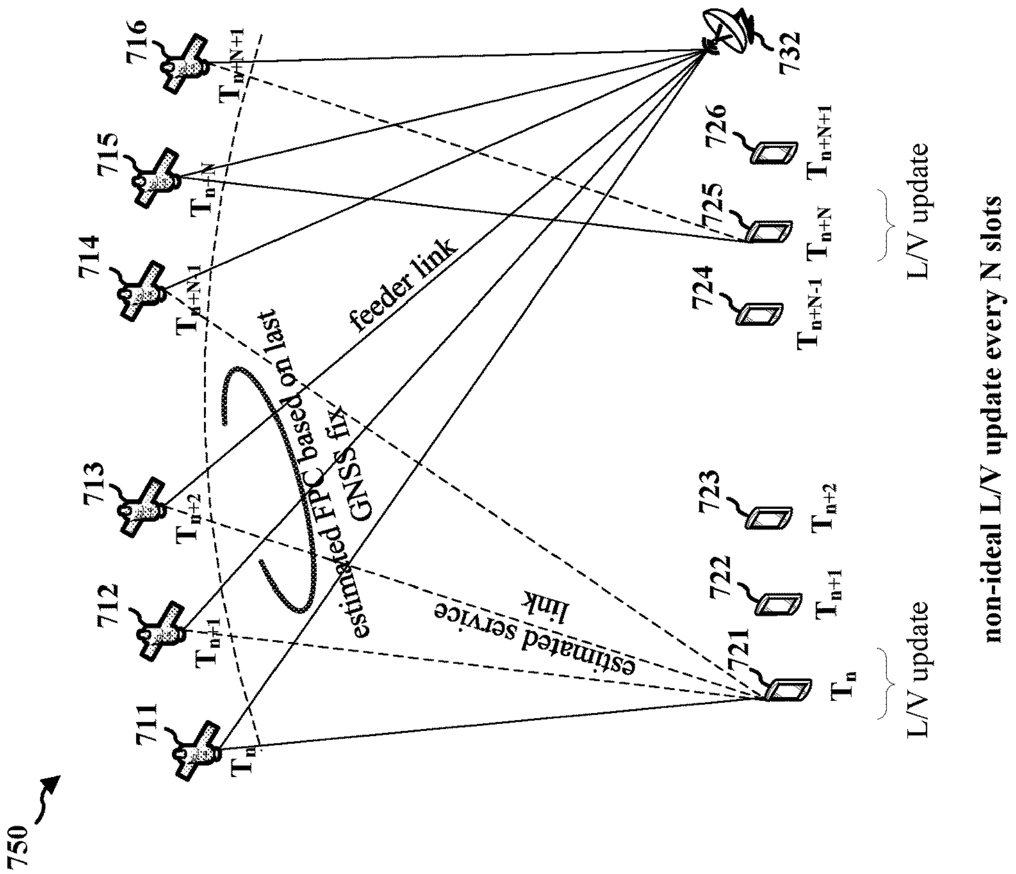
FIG. 7B shows a non-idealized NTN network 950 having a UE configured to perform a position update for every N slots, in accordance with various aspects of the present disclosure.
Figure 7A:
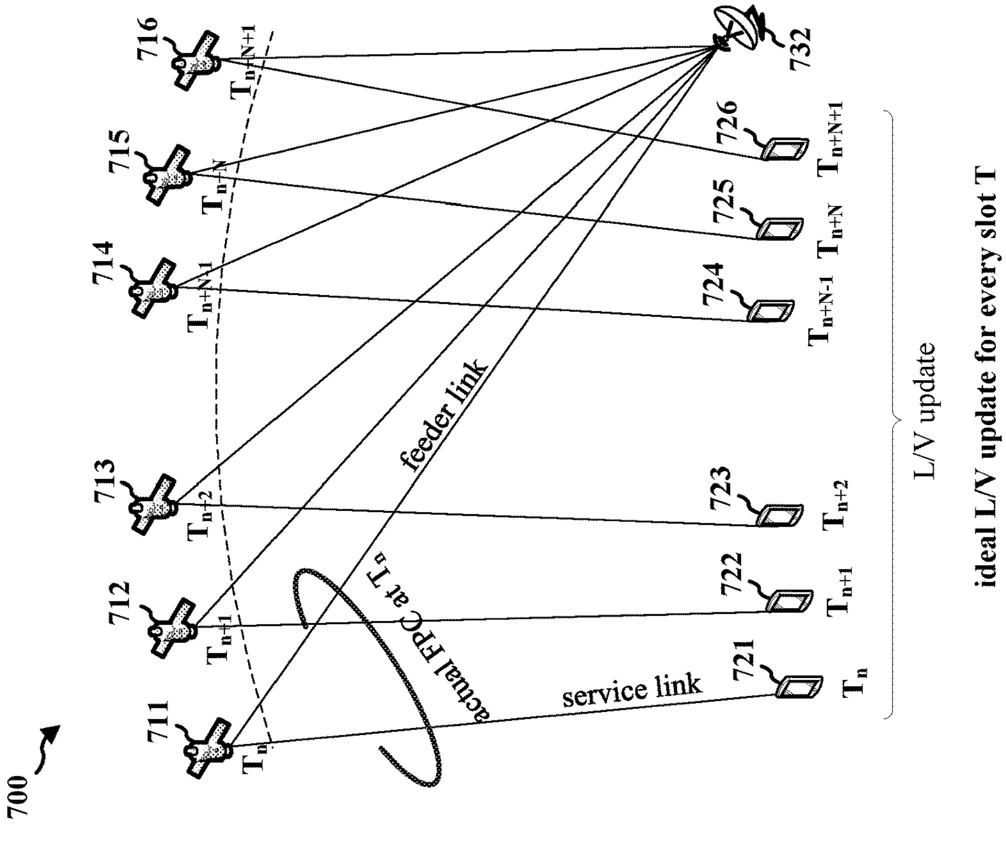
FIG. 7A shows an idealized NTN network having a UE configured to perform a position update for every uplink transmission to a network entity via an NTN device, in accordance with various aspects of the present disclosure.

FIG. 7A shows an idealized NTN network 700 having a UE configured to perform a location and velocity (L/V) update for every uplink transmission to a network entity 732 via an NTN device. The UE moves from location 721 at $T_n$ to location 722 at $T_{n+1}$ to location 723 at $T_{n+2}$ to location 724 at $T_{n+N-1}$ to location 725 at $T_{n+N}$ to location 726 at $T_{n+N+1}$. Similarly, the NTN device moves from location 711 at $T_n$ to location 712 at $T_{n+1}$ to location 713 at $T_{n+2}$ to location 714 at $T_{n+N-1}$ to location 715 at $T_{n+N}$ to location 716 at $T_{n+N+1}$. In other words, at $T_n$, the UE at location 721 transmits an uplink transmission to the network entity 732 via the NTN device at location 711. At $T_{n+1}$, the UE at location 722 transmits an uplink transmission to the network entity 732 via the NTN device at location 712. At $T_{n+2}$, the UE at location 723 transmits an uplink transmission to the network entity 732 via the NTN device at location 713. At $T_{n+N-1}$, the UE at location 724 transmits an uplink transmission to the network entity 732 via the NTN device at location 714. At $T_{n+N}$, the UE at location 725 transmits an uplink transmission to the network entity 732 via the NTN device at location 715. At $T_{n+N+1}$, the UE at location 726 transmits an uplink transmission to the network entity 732 via the NTN device at location 716.

In the idealized NTN network 700, the UE performs an L/V update for every uplink transmission, allowing for the UE to calculate an accurate $F_{FPC\_OPEN}$ value for every uplink transmission, as the UE may know its location relative to the NTN device at multiple points of time. However, an L/V update is a resource-intensive process to complete, consuming time, power, and bandwidth that may be more used more efficiently on other tasks.

FIG. 7B shows a non-idealized NTN network 750 having a UE configured to perform a location update (e.g., an L/V update) for every N slots. Similar to the idealized NTN network 700 in FIG. 7A, the UE in the non-idealized NTN network 750 also moves from location 721 at $T_n$ to location 722 at $T_{n+1}$ to location 723 at $T_{n+2}$ to location 724 at $T_{n+N-1}$ to location 725 at $T_{n+N}$ to location 726 at $T_{n+N+1}$. Similarly, the NTN device moves from location 711 at $T_n$ to location 712 at $T_{n+1}$ to location 713 at $T_{n+2}$ to location 714 at $T_{n+N-1}$ to location 715 at $T_{n+N}$ to location 716 at $T_{n+N+1}$. Again, at $T_n$, the UE at location 721 transmits an uplink transmission to the network entity 732 via the NTN device at location 711. At $T_{n+1}$, the UE at location 722 transmits an uplink transmission to the network entity 732 via the NTN device at location 712. At $T_{n+2}$, the UE at location 723 transmits an uplink transmission to the network entity 732 via the NTN device at location 713. At $T_{n+N-1}$, the UE at location 724 transmits an uplink transmission to the network entity 732 via the NTN device at location 714. At $T_{n+N}$, the UE at location 725 transmits an uplink transmission to the network entity 732 via the NTN device at location 715. At $T_{n+N+1}$, the UE at location 726 transmits an uplink transmission to the network entity 732 via the NTN device at location 716.

However, as the UE in a non-idealized NTN network 750 is configured to perform an L/V update for every N slots, the UE in non-idealized NTN network 750 may only perform an L/V update for the uplink transmission at $T_n$ and for the uplink transmission at $T_{n+N}$ (e.g., just before transmitting). For example, at $T_n$ the UE may be configured to estimate one way propagation delay over the service link and feeder link based on broadcasted ephemeris, $F_{FPC\_OFFSET}$ and epoch time and the location 721 of the UE.

While the UE may accurately estimate the service link distance at $T_n$ and at $T_{n+N}$, the UE may not accurately estimate the service link distance at $T_{n+1}$, $T_{n+2}$, $T_{n+N-1}$, and $T_{n+N+1}$. For example, the estimated service link distance may be longer than the actual service link distance at $T_{n+1}$, $T_{n+2}$, $T_{n+N-1}$, and $T_{n+N+1}$.

The UE in non-idealized NTN network 750 may be configured to use the last known L/V update location and velocity when estimating the service link between the UE and the NTN device. For example, at $T_{n+1}$, the UE may estimate its location to be at location 721, even though it is located at location 722. While the UE may correctly estimate the feeder link distance, the UE may incorrectly estimate the service link distance. This may affect the calculations that the UE makes to determine its $F_{FPC\_TOTAL}$—more specifically its $F_{FPC\_OPEN}$ value, which is used to determine its $F_{FPC\_TOTAL}$ value. The UE may be configured to determine its $F_{FPC\_OPEN}$ value based on an estimate of the service link distance and an estimate of the feeder link distance. At $T_{n+2}$, $T_{n+N-1}$, and $T_{n+N+1}$, the UE of non-idealized NTN network 750 may similarly estimate the service link distance using its last known location, as it may not have an accurate current location. At $T_{n+2}$, $T_{n+N-1}$, and/or $T_{n+N+1}$, the network may update the $F_{FPC\_CLOSED}$ value to compensate for a detected frequency synchronization error.

At $T_{n+N}$ the UE may perform a location update and may then determine that a transmission frequency error has occurred in its $F_{FPC\_TOTAL}$ value, and may then update its $F_{FPC\_OPEN}$ value based on its updated location at location 725. However, by that time, the network entity 732 may have also detected the transmission frequency error, and may have updated its $F_{FPC\_CLOSED}$ value to compensate for that frequency error. Calculating the $F_{FPC\_TOTAL}$ based on the updated location of the UE at location 725 may cause a double correction error, which may cause a transmission error if used.

A transmission frequency error may also occur for uplink transmissions that are sent when a UE may not have a direct line of sight (LoS) to an NTN device and has not compensated for a reflector.

Figure 8B:
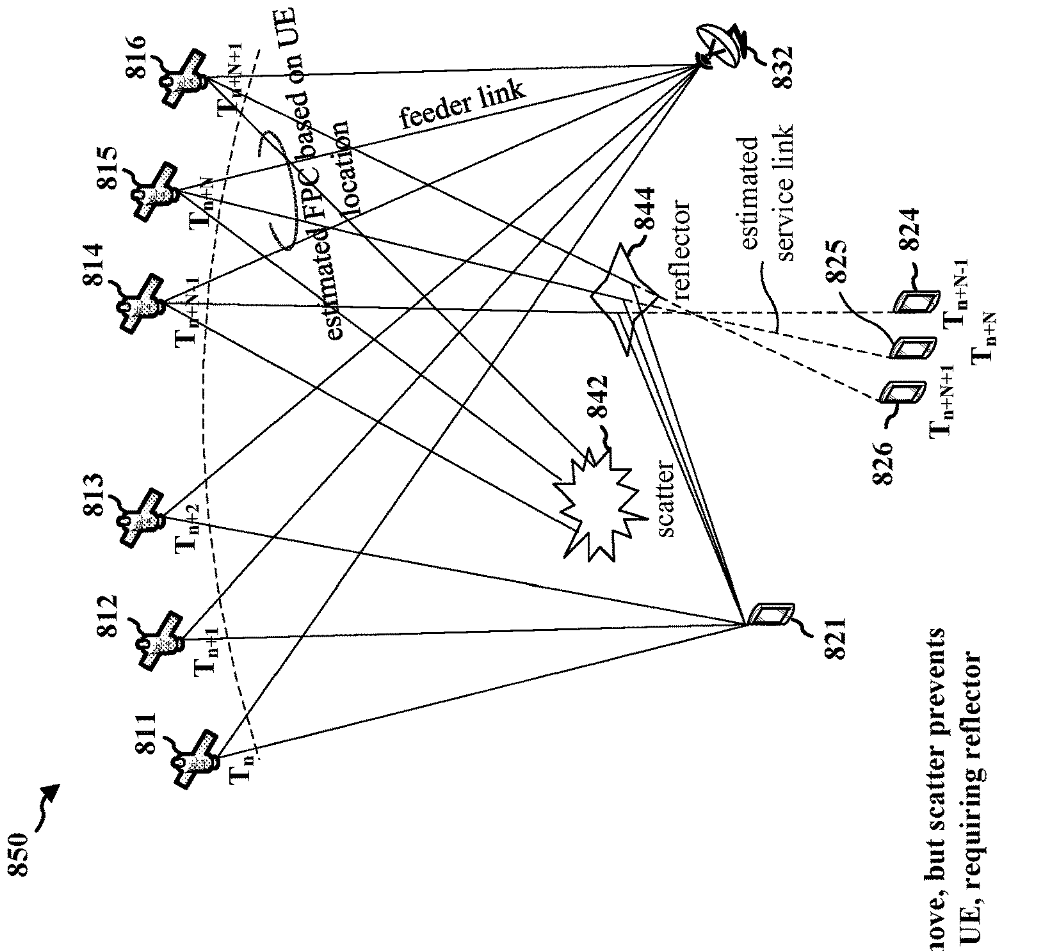
FIG. 8B shows the static UE position network of FIG. 8A with estimated service links between the NTN device and the UE, in accordance with various aspects of the present disclosure.
Figure 8A:
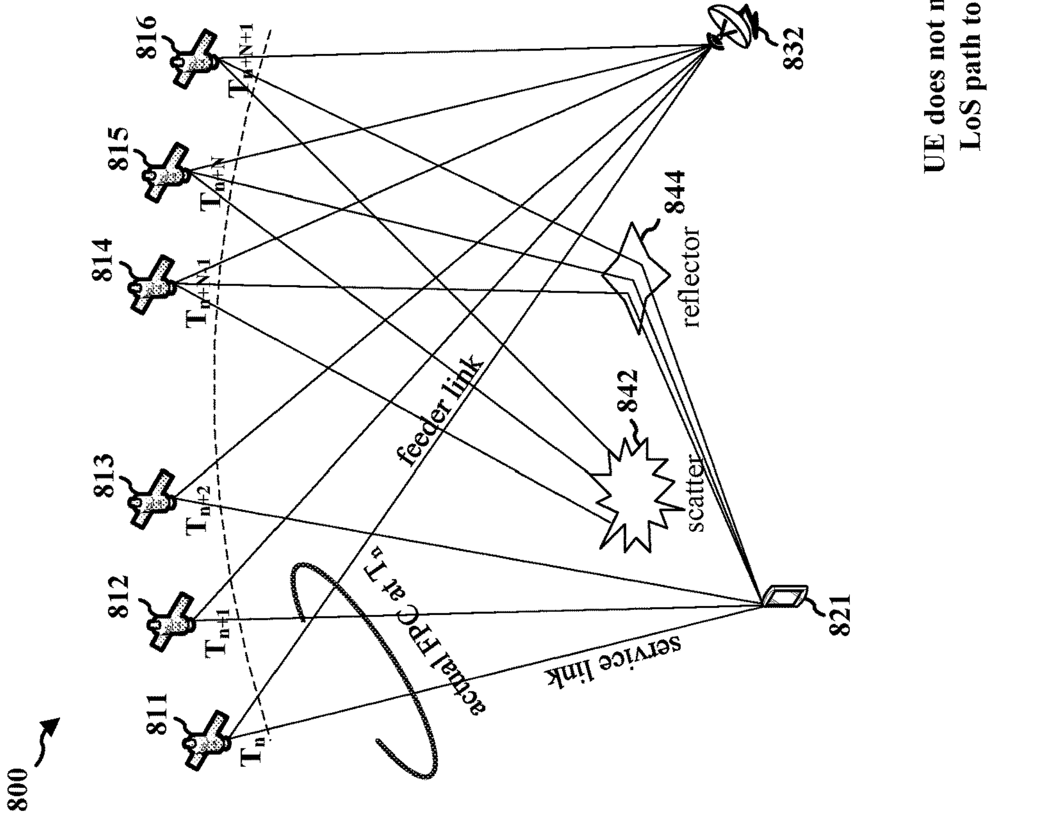
FIG. 8A shows a static UE position network having a UE that does not move from its position, in accordance with various aspects of the present disclosure.

FIG. 8A shows a static UE location network 800 having a UE that does not move from the location 821. The UE transmits uplink transmissions to a network entity 832 via an NTN device at $T_n$, $T_{n+1}$, $T_{n+2}$, $T_{n+N-1}$, $T_{n+N}$, and $T_{n+N+1}$. The NTN device moves from location 811 at $T_n$ to location 812 at $T_{n+1}$ to location 813 at $T_{n+2}$ to location 814 at $T_{n+N-1}$ to location 815 at $T_{n+N}$ to location 816 at $T_{n+N+1}$. While the UE has a direct LoS to the NTN device at $T_n$, $T_{n+1}$, and $T_{n+2}$, the UE does not have a direct LoS to the NTN device at $T_{n+N-1}$, $T_{n+N}$, and $T_{n+N+1}$. A scatter 842 prevents the UE from having a direct LoS to the NTN device at $T_{n+N-1}$, $T_{n+N}$, and $T_{n+N+1}$.

A reflector 844 may reflect a signal between the NTN device and the UE at $T_{n+N-1}$, $T_{n+N}$, and $T_{n+N+1}$.

FIG. 8B shows a static UE location network 850 illustrating estimated service links between the NTN device and the UE at $T_{n+N-1}$, $T_{n+N}$, and $T_{n+N+1}$. For example, at $T_{n+N-1}$, the UE may estimate its location to be at location 821 without using a reflector for transmissions, which may cause the UE to estimate a service link length at an effective location 824. At $T_{n+N}$, the UE may estimate its location to be at location 821 without using a reflector for transmissions, which may cause the UE to estimate a service link length at an effective location 825. At $T_{n+N+1}$, the UE may estimate its location to be at location 821 without using a reflector for transmissions, which may cause the UE to estimate a service link length at an effective location 826. In other words, at $T_{n+N-1}$, $T_{n+N}$, and $T_{n+N+1}$, the LoS-based propagation delay estimation error may be equivalently modeled as a UE location estimation error. Here, the estimated service link distance may be shorter than the actual service link distance at $T_{n+N-1}$, $T_{n+N}$, and $T_{n+N+1}$.

Similar to the UE in a non-idealized NTN network 750, while the UE in static UE location network 850 may correctly estimate the feeder link distance, the UE may incorrectly estimate the service link distance. This may affect the calculations that the UE makes to determine its $F_{FPC\_TOTAL}$ value, and more specifically its $F_{FPC\_OPEN}$ value, which is used to determine its $F_{FPC\_TOTAL}$ value. The UE may be configured to determine its $F_{FPC\_OPEN}$ value based on an estimate of the service link distance and an estimate of the feeder link distance.

The UE may detect that transmissions may be received from the NTN device through the reflector 844, for example by comparing a sent time-stamp from the network entity 832 to a received time-stamp at the UE at location 821 to determine that the estimated service link is inaccurate. In response, the UE may account for the reflector 844 in correcting its $F_{FPC\_OPEN}$ value. However, by that time, the network entity 832 may have also detected the transmission frequency error, and may have updated its $F_{FPC\_CLOSED}$ value to compensate for that frequency error. Calculating the $F_{FPC\_TOTAL}$ using both the $F_{FPC\_CLOSED}$ which accounts for an inaccurate estimated service link and the $F_{FPC\_OPEN}$ which accounts for an inaccurate estimated service link may cause a double correction error, which may cause a transmission error—particularly when the UE regains a LoS with the NTN device.

Figure 9:
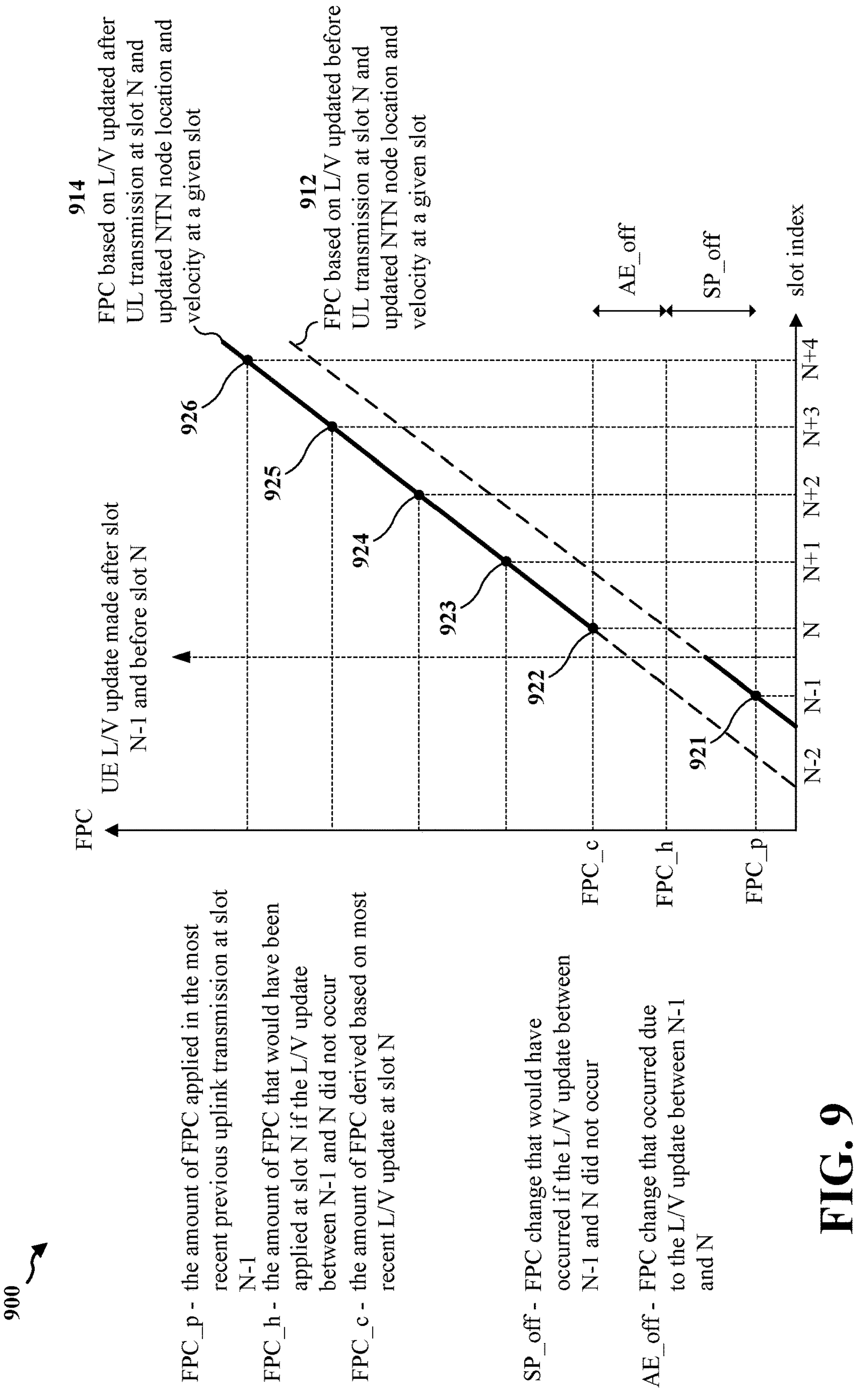
FIG. 9 shows a graph illustrating a sudden adjustment for an FPC over time, in accordance with various aspects of the present disclosure.

In FIG. 9, a graph 900 illustrates a sudden adjustment for an offset based on a corrected transmission frequency error. Graph 900 shows a graph having an x-axis of a slot index moving from N−2 to N+4 one slot at a time, and a y-axis of a calculated FPC based upon derived values, for example a $F_{FPC\_TOTAL}$ calculated as ($F_{FPC\_CLOSED}$+$F_{FPC\_OPEN}$+$F_{FPC\_OFFSET}$. At each of the slots N−2 to N+4, the UE may transmit an UL transmission to an NTN node using a frequency change based on the calculated FPC. The line 912 represents a calculated FPC based on a previously known UE location and velocity, while the line 914 represents a calculated FPC based on an updated UE location and velocity determined between slot N−1 and slot N. In other words, the line 912 may be an FPC based on the UE location and velocity applied to an uplink transmission before slot N using an updated NTN node location and velocity at each of the slots N−2 to N+4. The line 914 may be an FPC based on the UE location and velocity updated after an uplink transmission at slot N using an updated NTN node location and velocity at each of the slots N−2 to N+4. The UE may be configured to suddenly adjust its FPC for an offset based on its updated UE location and velocity.

At N−1, the UE may calculate an FPC using line 912 at point 921, which provides an FPC of FPC_p at slot N−1. FPC_p may represent an FPC calculation based on a previously known location and velocity of the UE. Between N−1 and N, the UE may perform an L/V update, and may update its FPC based upon newly derived values, for example a new location and velocity determined by a GNSS fix. At N, the UE may calculate an FPC using line 914 (i.e., using the UE position update made after slot N−1 and before slot N) at point 922, which provides an FPC of FPC_c at slot N. FPC_c may represent the amount of FPC derived based on a most recently updated UE location and velocity and an updated NTN location and velocity.

The total difference between the FPC at slot N−1 and the FPC at slot N is FPC_c−FPC_p. However, the new L/V update performed by the UE may not account for the total difference between the FPC at slot N−1 and the FPC at slot N. FPC_h shows an intersection of line 912 at slot N, which may represent an amount of FPC uplink transmission frequency derived based on the previously updated UE location and velocity and updated NTN node location and velocity at N. The difference between FPC_h and FPC_p is SP_off, which accounts for the frequency change to the FPC due to a NTN node location and velocity update between slot N−1 and slot N. The difference between FPC_c and FPC_h is AE_off, which accounts for the offset due to propagation path blocking or accumulated error due to stale UE position. In other words, the new L/V update performed by the UE accounts for the AE_off portion of the total difference between the FPC at slot N−1 and the FPC at slot N. In another aspect, AE_off may be considered the difference between $F_{FPC\_OPEN\_new}$ from $F_{FPC\_OPEN\_prev}$, where $F_{FPC\_OPEN\_new}$ is the calculated $F_{FPC\_OPEN}$ using the projected NTN node location and velocity at N and the updated UE location and velocity at N, and $F_{FPC\_OPEN\_prev}$ is the calculated $F_{FPC\_OPEN}$ using the projected NTN node location and velocity at N and the previous UE location and velocity at N−1.

At N, the UE may update its FPC to FPC_c using line 914 at point 922. From slot N forward, the UE may use line 914, providing an FPC update at point 923 at N+1, at point 924 at N+2, at point 925 at N+3, and at point 926 at N+4. However, by suddenly adjusting the FPC based upon the updated UE location and velocity determined just before slot N, the UE may double-count AE_off (i.e., a double-correction issue), as AE_off may already be accounted for by $F_{FPC\_CLOSED}$.

Figure 10:
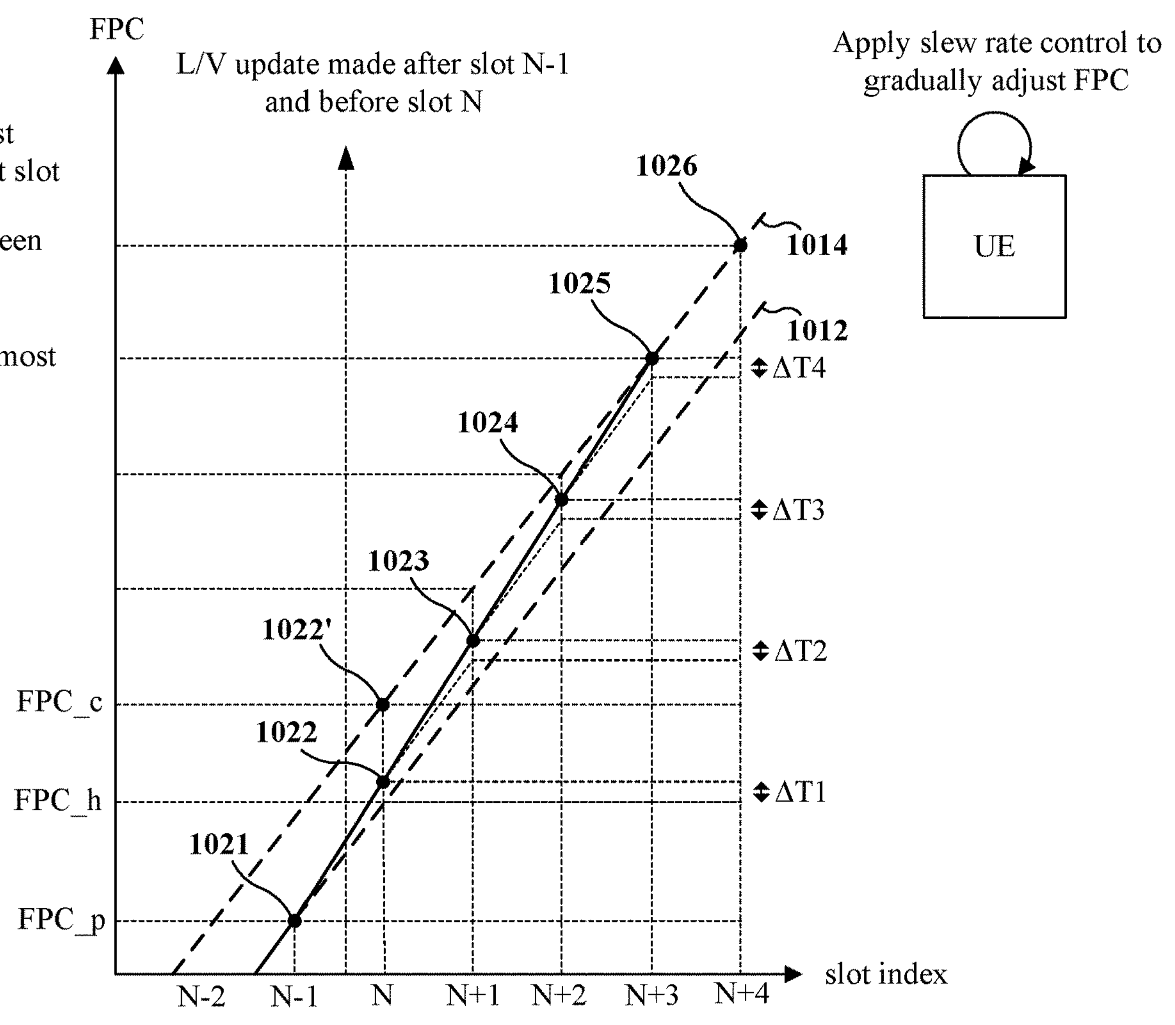
FIG. 10 shows a graph illustrating a gradual adjustment for an FPC over time, in accordance with various aspects of the present disclosure.

In FIG. 10, a graph 1000 illustrates a gradual adjustment for an offset based on an updated L/V. Similar to the graph 900 in FIG. 9, graph 1000 shows a graph having an x-axis of a slot index moving from N−2 to N+4 one slot at a time, and a y-axis of a calculated FPC based upon derived values. The line 1012 represents a calculated FPC based on a previously known UE location and velocity, while the line 1014 represents a calculated FPC based on an updated UE location and velocity determined between slot N−1 and slot N. However, instead of suddenly adjusting the FPC to point 1022' at slot N, the UE may be configured to gradually adjust the FPC to point 1022 at slot N. In other words, the UE may be configured to use a ΔT #value, which partially corrects the UE's offset over time instead of all at once.

Similar to the graph 900 in FIG. 9, at N−1 in graph 1000, the UE may calculate an FPC using line 1012 at point 1021, which provides an FPC of FPC_p. FPC_p may represent an FPC calculation based on a previously known location and velocity of the UE. Again, between N−1 and N, the UE may perform an L/V update, and may update its FPC based upon newly derived values, for example a new location and velocity determined by a GNSS fix. At N, the UE may calculate the FPC at point 1022 in a gradual manner, which provides a ΔT1 change from the amount of FPC that would have been applied at slot N if the L/V update between N−1 and N did not occur. At each slot, the UE may calculate the FPC in a gradual manner. For example, at N+1, the UE may calculate the FPC at point 1023 in a gradual manner, which provides an incremental ΔT2 change. At N+2, the UE may calculate the FPC at point 1024 in a gradual manner, which provides an incremental ΔT3 change. At N+3, the UE may calculate the FPC at point 1025 in a gradual manner, which provides an incremental ΔT4 change.

The FPC at point 1025 represents the FPC used by the UE using the current updated location and velocity based on the most recent L/V update. At N+4, the UE may calculate the FPC at point 1026 as normal. In other words, the UE may gradually increment the FPC. By gradually adjusting the FPC after an L/V update, the UE may minimize the effects of a double correction issue, as the network may gradually adjust its $F_{FPC\_CLOSED}$ value while the UE gradually adjusts its $F_{FPC\_OPEN}$ value. The line between point 1021 and point 1025 represents the FPC to be used by the UE during a gradual frequency adjustment.

As stated above, the UE may minimize the effects of a double-correction error by gradually updating its $F_{FPC\_OPEN}$ value over time. For example, in one aspect, the UE may be configured to perform slew rate control on its UE location and velocity. In other words, the UE may be configured to gradually update its location and velocity after it performs an L/V update. After an L/V update, when the UE updates its location and velocity, the UE may be configured to gradually change its location and velocity used in the calculation of $F_{FPC\_OPEN}$. For example, the UE may linearly combine or may filter the available UE locations and velocities to use an intermediary location and velocity in between the current location and velocity of the UE and the last known/previous location and velocity of the UE.

For example, a UE may be configured to perform an L/V update every T seconds, such that u(n*T) provides a value for the UE's current location (e.g., an x, y, or z axis value) at n*T seconds and u((n−1)*T) provides a value for the UE's previous location at (n−1)*T seconds. In other words, u(t') may be a function that provides a value for the UE's location at a time t'. At time t, where t is between the time n when the UE last performed an L/V update, the UE may multiply the previous location by a weight factor w and may multiply the current location by a corresponding weight factor (1−w), where the weight factor w≤1. An intermediary UE location value x(t) may be calculated as $x(t)=w*u(n*T)+(1-w)*u((n-1)*T)$, where $(n+1)\geq t\geq n*T$ and $w=(t-n*T)/T$. In other words, the intermediary UE location may be weighted based on the current location, previous location, and a time since the previous location update. As time t passes from time n to time n+1, the reported location value of the UE may linearly change from the previous location at time (n−1)*T to the current location at time n*T. Such a linear progression may be used for any values for the UE's location (e.g., x, y, or z-axis values) to gradually change the UE's location between L/V updates.

Similarly, a UE may be configured to perform an L/V update every T seconds, such that v_g(n*T) provides a value for the UE's current velocity (e.g., an x, y, or z axis value) at n*T seconds and v_g((n−1)*T) provides a value for the UE's previous velocity at (n−1)*T seconds. In other words, v_g(t') may be a function that provides a value for the UE's velocity at a time t'. At time t, where t is between the time n when the UE last performed an L/V update, the UE may multiply the previous velocity by a weight factor w and may multiply the current location by a corresponding weight factor (1−w), where the weight factor w≤1. An intermediary UE velocity value v(t) may be calculated as v(t)=w*v_g (n*T)+(1−w)*v_g((n−1)*T), where (n+1)≥t≥n*T and w=(t−n*T)/T. In other words, the intermediary UE velocity may be weighted based on the current velocity, previous velocity, and a time since the previous velocity update. As time t passes from time n to time n+1, the reported velocity value of the UE may linearly change from the previous velocity at time (n−1)*T to the current velocity at time n*T. Such a linear progression may be used for any values for the UE's velocity (e.g., x, y, or z-axis values) to gradually change the UE's velocity between L/V updates.

In other words, at time n*T, the UE may be configured to use a UE's previous location and velocity, at time (n+1)*T the UE may be configured to use a UE's current location and velocity, and in between times n*T and (n+1)*T, the UE may be configured to linearly slew the UE's location and velocity between its previous and current location and velocity using one or more calculated intermediary locations and velocities. After time (n+1)*T, the UE may not slew the UE's location and velocity. Instead, the UE may have a subsequent location and velocity generated by a new L/V update.

In another aspect, the UE may be configured to perform slew rate control on its open-loop FPC value. In other words, the UE may be configured to adjust its FPC value such that the difference between the amount of FPC derived based on most recent L/V update and the amount of FPC that would have been derived based on the previous L/V update is less than a threshold value. For example, in FIG. 9, if AE_off is larger than a threshold value, the UE may be configured to gradually adjust the FPC.

The following example provides yet another manner to illustrate how slew rate control on an open-loop FPC value may be performed. A UE's location may be deemed to be (x_u). A UE's velocity may be deemed to be (v_u). An NTN node's location may be deemed to be (x_s). An NTN node's velocity may be deemed to be (v_x). A function f(x_u, v_u, x_s, v_s) may be used to describe the formula for an $F_{FPC\_OPEN}$. A UE's current location value may be deemed to be (x_u_c). A UE's current velocity value may be deemed to be (v_u_c). An NTN node's current location value may be deemed to be (x_s_c). An NTN node's current velocity value may be deemed to be (v_s_c). A UE's previous location value may be deemed to be (x_u_p). A UE's previous velocity value may be deemed to be (v_u_p).

Therefore, the function f(x_u_p, v_u_p, x_s_c, v_s_c) may represent the $F_{FPC\_OPEN}$ value using the UE's previously known location and velocity and the NTN node's currently known location and velocity, while the function f(x_u_c, v_u_c, x_s_c, v_s_c) may represent the $F_{FPC\_OPEN}$ value using the UE's currently known location and velocity and the NTN node's currently known location and velocity. In other words, f(x_u_p, v_u_p, x_s_c, v_s_c) may be based on the previous UE location update and the previous UE velocity update, and f(x_u_c, v_u_c, x_s_c, v_s_c) may be based on the current UE location update and the current UE velocity update. A threshold value F1 may represent a frequency threshold that triggers slew rate control on a UE's open-loop FPC value. In response to determining that |f(x_u_c, v_u_c, x_s_c, v_s_c)−f(x_u_p, v_u_p, x_s_c, v_s_c)|>F1, the UE may be configured to adjust the $F_{FPC\_OPEN}$ that it uses for an uplink transmission (i.e., f_used) such that |f_used−f(x_u_p, v_u_p, x_s_c, v_s_c)|≤F1. In other words, in response to an FPC difference value between f(x_u_c, v_u_c, x_s_c, v_s_c) and f(x_u_p, v_u_p, x_s_c, v_s_c) being greater than F1 (or equal to F1 in other aspects), the UE may be configured to adjust f_used such that the FPC difference value between f_used and f(x_u_p, v_u_p, x_s_c, v_s_c) is less than or equal to the frequency threshold F1. Adjusting the value of f_used may adjust an $F_{FPC\_OPEN}$ value by a corresponding amount, and hence also an $F_{FPC\_TOTAL}$ value based on the $F_{FPC\_OPEN}$ value.

The UE may be further configured to adjust f_used to satisfy one or more threshold requirements. For example, the UE may be configured to ensure that the maximum amount of magnitude of the FPC difference value between f_used and f(x_u_p, v_u_p, x_s_c, v_s_c) in one adjustment (i.e., a single adjustment for the UE's uplink transmission immediately after the L/V update) does not exceed a first threshold value F1. The UE may be configured to ensure that the minimum aggregate adjustment rate of the FPC adjustments over a period of time (e.g., 0.5 s, 1 s, 1.5 s, 2 s, etc.) that meets or exceeds a second threshold value F2. For example, the sum of f_used and the set of past FPC adjustments over the period of time may be configured to meet or exceed the second threshold value F2. The UE may be configured to ensure that the maximum aggregate adjustment rate of FPC adjustments over a period of time (e.g., 100 ms, 200 ms, 300 ms, 400 ms, etc.) does not meet or exceed a third threshold value F3. For example, the sum of f_used and the set of past FPC adjustments over the period of time may be configured to be less than or at most meet the third threshold value F3. Once f_used=f(x_u_c, v_u_c, x_s_c, v_s_c), the UE may not slew the $F_{FPC\_OPEN}$ value until a subsequent location and velocity of the UE is generated by a new L/V update.

In another aspect, the UE may be configured to perform slew rate control on its open-loop FPC value while addressing overlapping frequency adjustment procedures. In other words, the UE may be configured to adjust its f_used or total FPC adjustment value as described above such that the difference between the amount of FPC derived based on an L/V update 1 and the amount of FPC that would have been derived based on a previous L/V update 0 is less than a threshold value, and also may be configured to use an intermediary FPC value if a subsequent location and velocity is generated by a new L/V update 2 but f_used does not yet equal f(x_u_c, v_u_c, x_s_c, v_s_c), where L/V update 0 occurs before L/V update 1 and L/V update 1 occurs before L/V update 2. In such an aspect, after L/V update 2, the new x_u_c and v_u_c values may be updated based on L/V update 2, but the new x_u_p and v_u_p values based on L/V update 1 may not be used, as f_used did not reach the f(x_u_c, v_u_c, x_s_c, v_s_c) based on L/V update 1.

When the UE receives an update (e.g., L/V update 2) to the UE's location and velocity during an ongoing gradual frequency adjustment procedure due to a previous update (e.g., L/V update 1), the UE may be configured to adjust its subsequent total FPC adjustment value such that the difference between the subsequent amount of FPC derived based on the subsequent L/V update 2 and the amount of FPC that would have been derived based on the previous L/V update 1 is less than another threshold value Fe The following example provides another manner to illustrate how slew rate control on an open-loop FPC value may be performed while addressing overlapping frequency adjustment procedures. The parameter f_used_without_update2 may represent the f_used value that the UE would have used after the L/V update 2, if the L/V update 2 did not occur (i.e., the location and velocity of the UE did not update a second time before f_used=f(x_u_c, v_u_c, x_s_c, v_s_c)). In other words, f_used_without_update2 may represent an FPC adjustment based on the first UE location update and the first UE velocity update (L/V update 1) for a time after the L/V update 2, and f(x_u_c, v_u_c, x_s_c, v_s_c) may represent an FPC adjustment based on the second UE location update and the second UE velocity update (L/V update 2) for that same time. In response to determining that |f_used_without_update2−f(x_u_c, v_u_c, x_s_c, v_s_c)|>Fe, the UE may be configured to adjust the $F_{FPC\_OPEN}$ that it uses (i.e., f_used_with_update2) such that |f_used_with_update2−f(x_u_c, v_u_c, x_s_c, v_s_c)|≤Fe. In other words, in response to a subsequent FPC difference value between f_used_without_update2 and f(x_u_p, v_u_p, x_s_c, v_s_c) being greater than Fe (or equal to Fe in other aspects), the UE may be configured to adjust f_used_with_update2 such that the subsequent FPC difference value between f_used_with_update2 and f(x_u_c, v_u_c, x_s_c, v_s_c) (i.e., a new subsequent FPC difference value) is less than or equal to the frequency threshold Fe.

The UE may be further configured to adjust f_used_with_update2 to satisfy one or more threshold requirements. For example, the UE may be configured to ensure that the maximum amount of magnitude of the subsequent FPC difference value between f_used_with_update2 and f(x_u_c, v_u_c, x_s_c, v_s_c) in one adjustment (i.e., a single adjustment for the UE's uplink transmission immediately after the L/V update 2) does not exceed a first threshold value Fe. The UE may be configured to ensure that the minimum aggregate adjustment rate of a sum of the subsequent FPC difference value between f_used_with_update2 and f(x_u_c, v_u_c, x_s_c, v_s_c) and a set of FPC adjustments over a period of time (e.g., 0.5 s, 1 s, 1.5 s, 2 s, etc.) meets or exceeds a second threshold value F2. For example, adding the difference between f_used_with_update2 and f(x_u_p, v_u_p, x_s_c, v_s_c) to the set of past FPC adjustments over the period of time may be configured to meet or exceed the second threshold value F2. The UE may be configured to ensure that the maximum aggregate adjustment rate of a sum of the subsequent FPC difference value between f_used_with_update2 and f(x_u_c, v_u_c, x_s_c, v_s_c) and a set of FPC adjustments over a period of time (e.g., 100 ms, 200 ms, 300 ms, 400 ms, etc.) meets or does not exceed a third threshold value F3. For example, adding the difference between f_used_with_update2 and f(x_u_p, v_u_p, x_s_c, v_s_c) to the set of past FPC adjustments over the period of time may be configured to be less than or at most meet the third threshold value F3. Once f_used_with_update2=f(x_u_c, v_u_c, x_s_c, v_s_c), the UE may not slew the $F_{FPC\_OPEN}$ value until a subsequent location and velocity is generated by a new L/V update.

In FIG. 11, a graph 1100 illustrates a gradual adjustment for an offset based on an updated L/V while addressing overlapping frequency adjustment procedures. Similar to the graph 1000 in FIG. 10, graph 1100 shows a graph having an x-axis of a slot index moving from N−2 to N+4 one slot at a time, and a y-axis of a calculated FPC based upon derived values. The line 1112 represents a calculated FPC based on a previously known UE location and velocity, the line 1114 represents a calculated FPC based on a first updated UE location and velocity determined between slot N−1 and slot N, and the line 1116 represents a calculated FPC based on a second updated UE location and velocity determined between slot N+1 and N+2. Likewise, instead of suddenly adjusting the FPC to point 1122' at slot N, the UE may be configured to gradually adjust the FPC to point 1122 at slot N. In other words, the UE may be configured to use a ΔT #value, which partially corrects the UE's offset over time instead of all at once.

At N−1, the UE may calculate an FPC using line 1112 at point 1121, which provides an FPC of FPC_p. FPC_p may represent an FPC calculation based on a previously known location and velocity of the UE. Between N−1 and N, the UE may perform an L/V update 1, and may update its FPC based upon newly derived values, for example a new location and velocity determined by a GNSS fix. At N, the UE does not suddenly adjust the FPC to point 1122', which represents the FPC calculated using the new location and velocity determined by L/V update 1. Instead, at N, the UE may calculate the FPC at point 1122 in a gradual manner, which provides a ΔT1 change from the amount of FPC that would have been applied at slot N if the L/V update between N−1 and N did not occur. At N+1, the UE may continue to calculate the FPC at point 1123 in a gradual manner to align with the line 1114, which provides an incremental ΔT2 change.

However, between N+1 and N+2, the UE may perform another L/V update 2, for example in response, and may update its FPC based upon subsequently derived values, for example a subsequent location and velocity determined by a GNSS fix. At N+2, the UE does not gradually adjust the FPC to point 1124', which represents a gradual incline to reach line 1112. At N+2, the UE also does not suddenly adjust the FPC to point 1124", which represents the FPC calculated using the subsequent location and velocity determined by L/V update 2. Instead, at N+2, the UE may calculate the FPC at point 1124 in a different gradual manner, which provides a ΔT3 change from the amount of FPC that would have been applied at slot N+2 if the L/V update 2 between N+1 and N+2 did not occur. At N+3, the UE may calculate the FPC at point 1125 in the second gradual manner, which provides an incremental ΔT4 change from the amount of FPC that would have been applied at slot N+3 if the L/V update 2 between N+1 and N+2 did not occur. At N+4, the UE may calculate the FPC at point 1126 in the second gradual manner, which provides an incremental ΔT5 change from the amount of FPC that would have been applied at slot N+4 if the L/V update 2 between N+1 and N+2 did not occur.

In another aspect, the UE may be configured to perform gradual control of its uplink center frequency. In other words, in response to determining that the transmission frequency error between the UE and a reference frequency exceeds a threshold value±Fe, the UE may be configured to adjust its frequency to be within ±Fe. The reference frequency ($F_{REF}$) may be based on:

$$F_{REF}=F_{FPC\_CLOSED}+F_{FPC\_OPEN}+F_{FPC\_OFFSET}+f(F\_d)$$

$F_{FPC\_CLOSED}$, $F_{FPC\_OPEN}$, and $F_{FPC\_OFFSET}$ may be as previously described regarding $F_{FPC\_TOTAL}$. F_d may be the center frequency of a received DL transmission from an NTN node. In other words, $F_{REF}$ may be determined as a function of a frequency based on a download frequency. An example f(F_d) may be f(F_d)=F_d*f_u/f_d, where f_u is the center frequency of an ideal uplink transmission and f_d is the center frequency of an ideal DL transmission (e.g., frequencies used by a UE if there was no doppler shift). Values for f_u and f_d may be provided in a lookup table associated with a frequency band. For example, a channel having a defined band may have an f_u of 2 GHz and an f_d of 1.98 GHz defined in a lookup table.

The UE may be configured to adjust a $F_{REF}$ such that a frequency change (i.e., a transmission frequency error value) between a future transmission using the adjusted $F_{REF}$ and a previous transmission using the previous $F_{REF}$, apart from a change of $F_{FPC\_OPEN}$ between the two transmissions due to an NTN node location and velocity update, satisfies one or more threshold requirements. A change of $F_{FPC\_OPEN}$ between the two transmissions due to an NTN node location and velocity update may be, for example, SP_off in the graph 900 in FIG. 9, if $F_{FPC\_CLOSED}$ is not updated between N−1 and N. The UE may be configured to adjust the $F_{REF}$ when the frequency change between the future transmission using a non-adjusted $F_{REF}$ (applying the formula above to current values) and the previous transmission using the previous $F_{REF}$ (applying the formula above to the values of the last transmission), apart from a change of $F_{FPC\_OPEN}$ between the two transmissions due to an NTN node location and velocity update, exceeds ±Fe. The UE may be configured to ensure that the maximum amount of magnitude of the frequency change between a future transmission using the adjusted $F_{REF}$ and a previous transmission using the previous $F_{REF}$, apart from a change of $F_{FPC\_OPEN}$ between the two transmissions due to an NTN node location and velocity update, in one adjustment does not exceed a first threshold value Fq. The UE may be configured to ensure that the minimum aggregate adjustment rate of a sum of the frequency change between a future transmission using the adjusted $F_{REF}$ and a previous transmission using the previous $F_{REF}$, apart from a change of $F_{FPC\_OPEN}$ between the two transmissions due to an NTN node location and velocity update, and a set of FPC adjustments, apart from changes of $F_{FPC\_OPEN}$ between transmissions due to an NTN node location and velocity update, over a period of time (e.g., 0.5 s, 1 s, 1.5 s, 2 s, etc.) that meets or exceeds a second threshold value Fp. The UE may be configured to ensure that the maximum aggregate adjustment rate of a sum of the frequency change between a future transmission using the adjusted $F_{REF}$ and a previous transmission using the previous $F_{REF}$, apart from a change of $F_{FPC\_OPEN}$ between the two transmissions due to an NTN node location and velocity update, and a set of FPC adjustments, apart from changes of $F_{FPC\_OPEN}$ between transmissions due to an NTN node location and velocity update, over a period of time (e.g., 100 ms, 200 ms, 300 ms, 400 ms, etc.) meets or does not exceed a third threshold value Fr. In some aspects, Fr may equal Fq. Once the frequency change between a future transmission using the adjusted $F_{REF}$ and a previous transmission using the previous $F_{REF}$, apart from a change of $F_{FPC\_OPEN}$ between the two transmissions due to an NTN node location and velocity update, is zero, the UE may not perform gradual control of its uplink center frequency.

Figure 12:
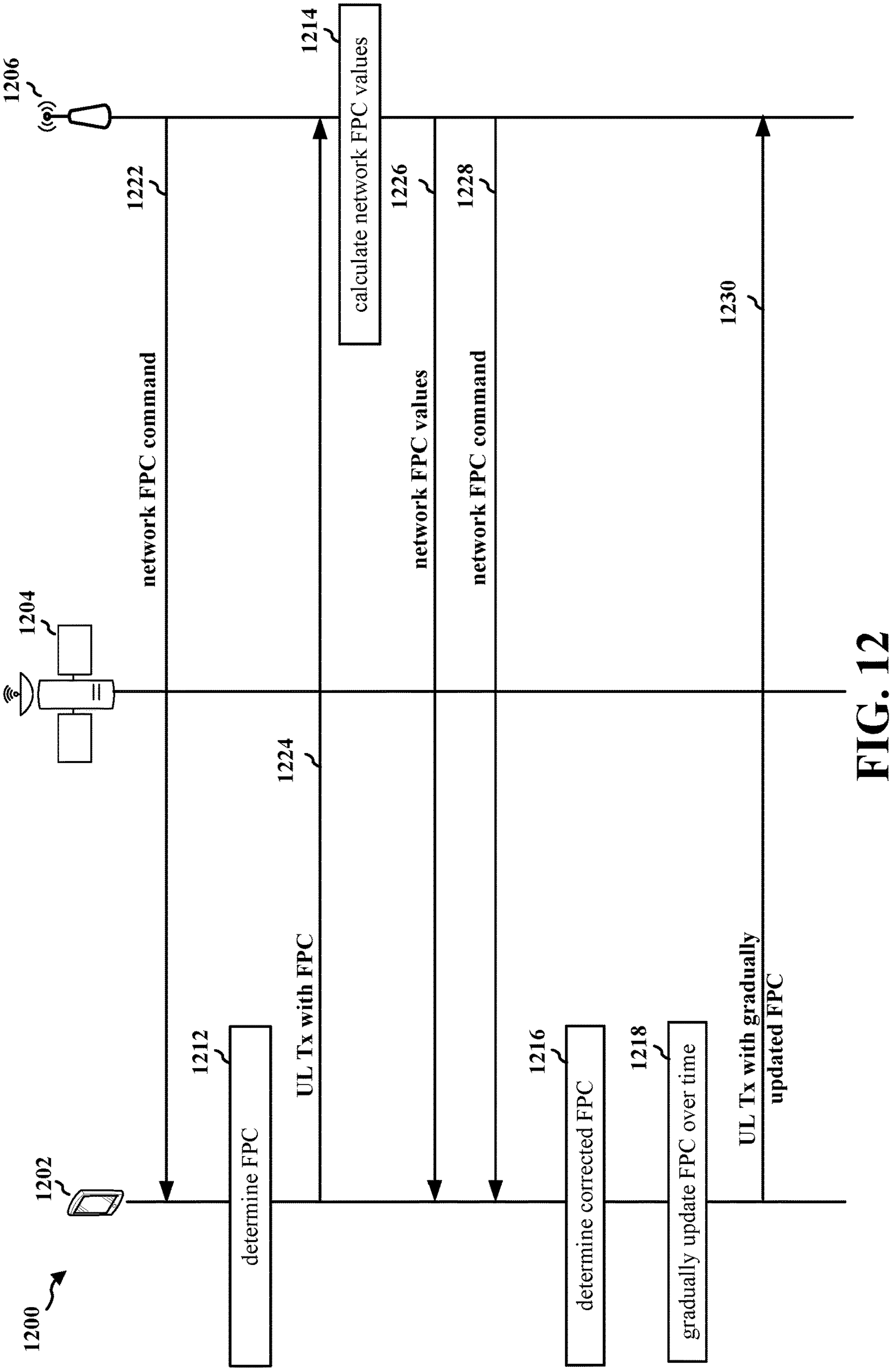
FIG. 12 shows a connection flow diagram having a UE configured to transmit an uplink transmission to a network entity via a NTN device, in accordance with various aspects of the present disclosure.

In FIG. 12, a connection flow diagram 1200 has a UE 1202 configured to transmit an uplink transmission to a network entity 1206 via a NTN device 1204.

The network entity 1206 may be configured to transmit a network FPC command 1222 to the UE 1202 to adjust the frequency of an uplink transmission to compensate for propagation delay. In response, the UE 1202 may then be configured to adjust a frequency of its uplink transmission signals, such as uplink transmission 1224 and uplink transmission 1230, to the network entity 1206 using an FPC to compensate for propagation delay. In some aspects, the network entity 1206 may be configured to transmit the network FPC command 1222 in response to detecting a frequency error associated with the UE 1202 being greater or equal to a threshold value.

At 1212, the UE 1202 may determine an FPC. Such an FPC may be based on, for example, an $F_{FPC\_TOTAL}$ value based on $F_{FPC\_CLOSED}+F_{FPC\_OPEN}+F_{FPC\_OFFSET}$ or an $F_{REF}$ value based on $F_{FPC\_CLOSED}+F_{FPC\_OPEN}+F_{FPC\_OFFSET}+f(F\_d)$. The FPC may be calculated, for example, based on an estimated location and velocity of the NTN device 1204, an estimated location and velocity of the UE 1202, and/or an estimated environment for a beam between the UE 1202 and the NTN device 1204 without propagation path blocking. The UE 1202 may be configured to transmit an uplink transmission 1224 to the network entity 1206 via the NTN device 1204 using the calculated FPC value to adjust a frequency of the uplink transmission 1224.

At 1214, the network entity 1206 may be configured to calculate network FPC values. Such values may include, for example, $F_{FPC\_CLOSED}$, and/or $F_{FPC\_OFFSET}$. For example, the network entity 1206 may detect an error in a frequency used by the UE, and may change $F_{FPC\_CLOSED}$ to account for the network entity detected transmission frequency error. The network entity 1206 may then transmit at least some of the network FPC values 1226 to the UE 1202 for the UE to use in its calculations of a FPC, for example an $F_{FPC\_CLOSED}$ value. The network entity 1206 may also transmit another network FPC command 1228 to the UE 1202 via the NTN device 1204. In some aspects, the network entity 1206 may be configured to transmit the network FPC command 1228 in response to detecting a frequency error associated with the UE 1202 being greater or equal to a threshold value.

At 1216, the UE 1202 may determine a corrected FPC. For example, the UE 1202 may perform a GNSS fix update to determine an updated location and velocity, has determined that the UE 1202 may not have the same location and velocity as it did during the previous GNSS fix, and may update a location and velocity of the UE 1202. In another aspect the UE 1202 may determine that a previous transmission, such as the uplink transmission 1224, was blocked and was transmitted via a reflector, and an updated service link length may be used to calculate $F_{FPC\_OPEN}$.

At 1218, the UE 1202 may gradually update the FPC over time. For example, the UE may be configured to perform slew rate control on its UE location and velocity, perform slew rate control on its open-loop FPC value while not addressing overlapping frequency adjustment procedures, perform slew rate control on its open-loop FPC value while addressing overlapping frequency adjustment procedures, or perform gradual control of its uplink center frequency. The UE 1202 may be configured to transmit an uplink transmission 1230 to the network entity 1206 via the NTN device 1204 using the gradually updated FPC.

Figure 13:
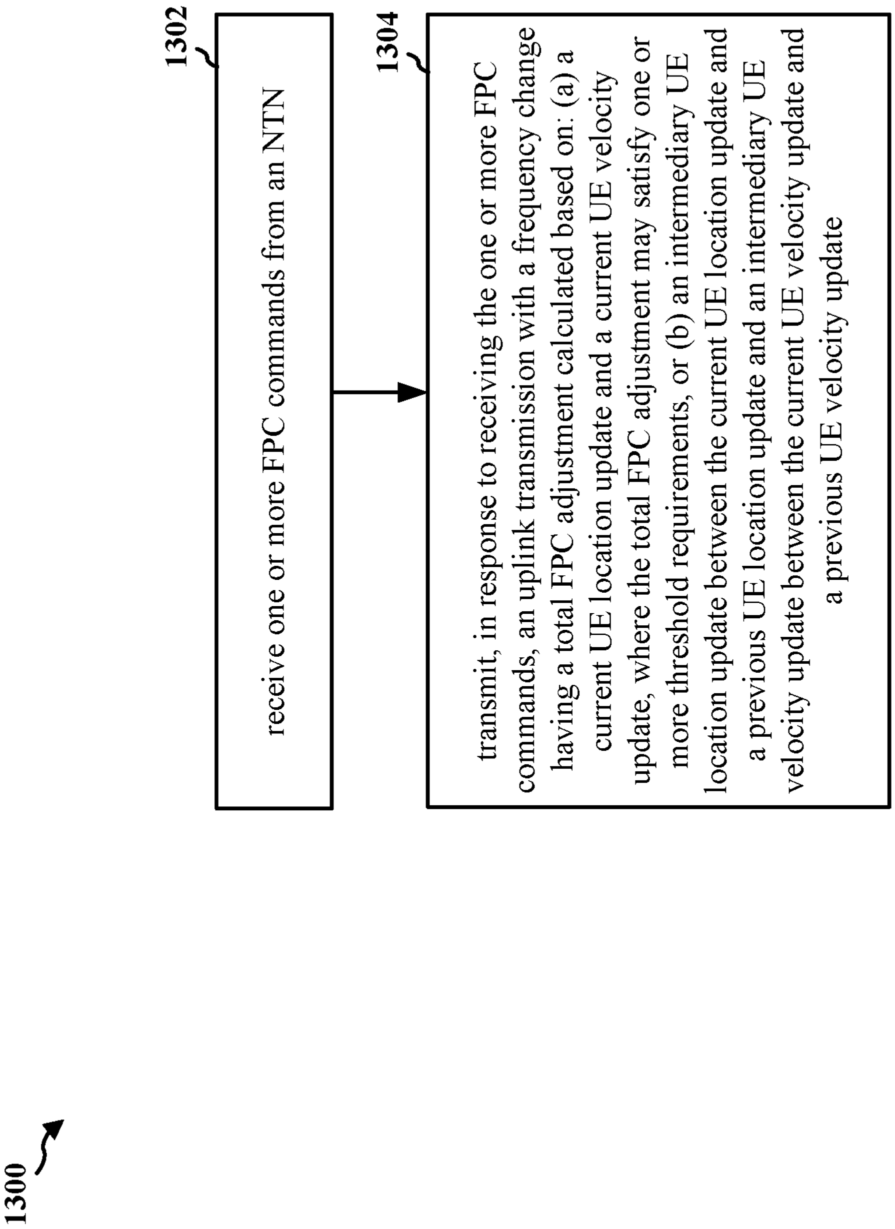
FIG. 13 is a flowchart of a method of wireless communication, in accordance with various aspects of the present disclosure.

FIG. 13 is a flowchart 1300 of a method of wireless communication. The method may be performed by a UE (e.g., the UE 104, 350, 405, 530, 1202; the apparatus 1504). At 1302, the UE may be configured to receive one or more FPC commands from an NTN. For example, 1302 may be performed by the UE 1202 in FIG. 12, which may receive a network FPC command 1228 from the network entity 1206 via the NTN device 1204. 1302 may also be performed by the FPC component 198 of apparatus 1504 in FIG. 15.

At 1304, the UE may be configured to transmit, in response to receiving the one or more FPC commands, an uplink transmission with a frequency change having a total FPC adjustment. The total FPC adjustment may be calculated based on a current UE location update and a current UE velocity update. The total FPC adjustment may satisfy one or more threshold requirements. The total FPC adjustment may be calculated based on an intermediary UE location update between the current UE location update and a previous UE location update and an intermediary UE velocity update between the current UE velocity update and a previous UE velocity update. For example, 1304 may be performed by the UE 1202 in FIG. 12, which may, in response to receiving the network FPC command 1228 from the network entity 1206 via the NTN device 1204, transmit an uplink transmission 1230 to the network entity 1206 via the NTN device 1204 using a gradually updated FPC. The gradually updated FPC may be gradually updated over time at 1218 by performing slew rate control on its UE location and velocity. The gradually updated FPC may be gradually updated over time at 1218 by performing slew rate control on its open-loop FPC value while not addressing overlapping frequency adjustment procedures. The gradually updated FPC may be gradually updated over time at 1218 by performing slew rate control on its open-loop FPC value while addressing overlapping frequency adjustment procedures. The gradually updated FPC may be gradually updated over time at 1218 by performing gradual control of its uplink center frequency. 1304 may also be performed by the FPC component 198 of apparatus 1504 in FIG. 15.

Figure 14:
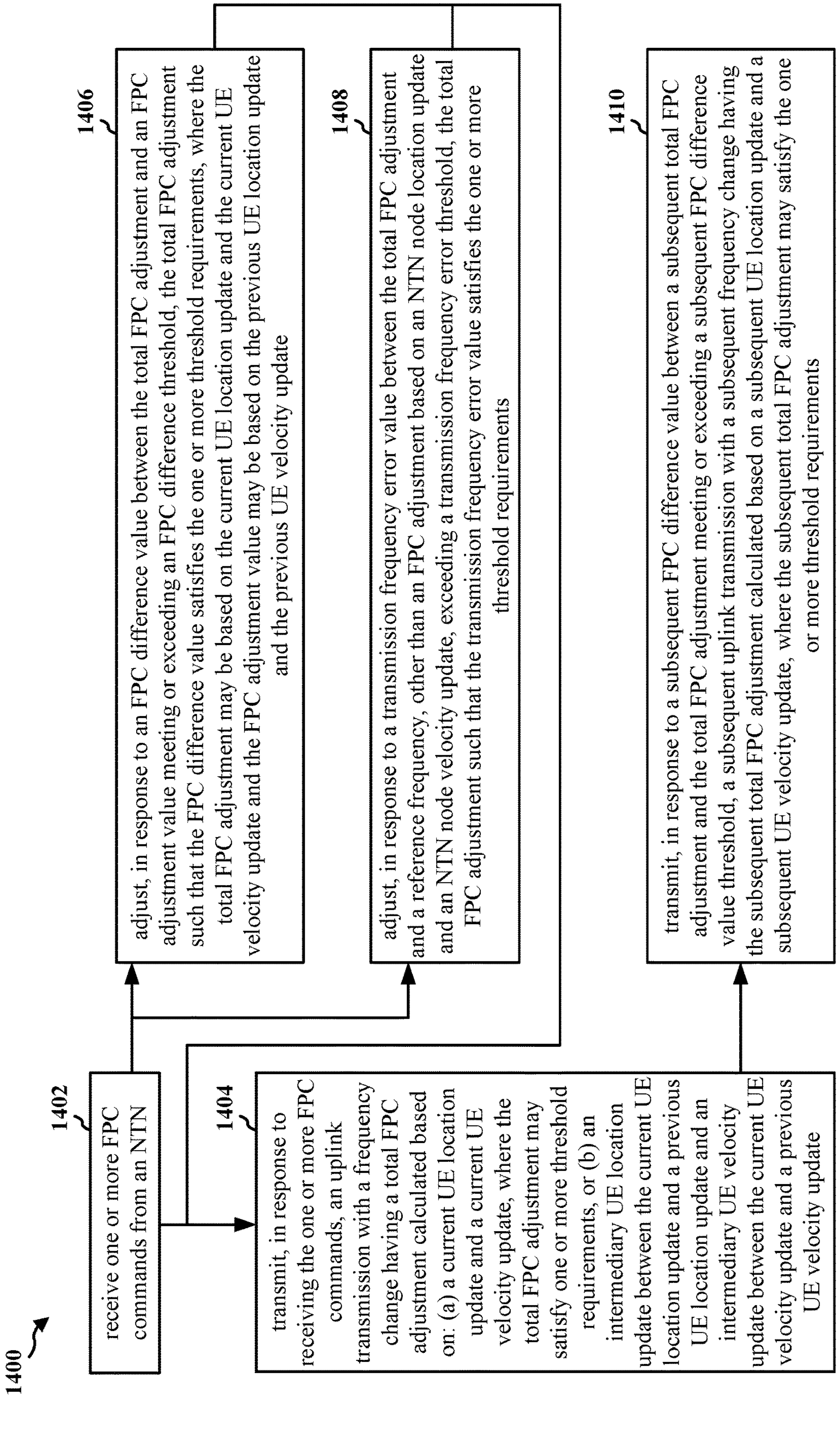
FIG. 14 is another flowchart of a method of wireless communication, in accordance with various aspects of the present disclosure.

FIG. 14 is a flowchart 1400 of a method of wireless communication. The method may be performed by a UE (e.g., the UE 104, 350, 405, 530, 1202; the apparatus 1504). At 1402, the UE may be configured to receive one or more FPC commands from an NTN. For example, 1402 may be performed by the UE 1202 in FIG. 12, which may receive a network FPC command 1228 from the network entity 1206 via the NTN device 1204. 1402 may also be performed by the FPC component 198 of apparatus 1504 in FIG. 15.

At 1404, the UE may be configured to transmit, in response to receiving the one or more FPC commands, an uplink transmission with a frequency change having a total FPC adjustment. The total FPC adjustment may be calculated based on a current UE location update and a current UE velocity update. The total FPC adjustment may satisfy one or more threshold requirements. The total FPC adjustment may be calculated based on an intermediary UE location update between the current UE location update and a previous UE location update and an intermediary UE velocity update between the current UE velocity update and a previous UE velocity update. For example, 1404 may be performed by the UE 1202 in FIG. 12, which may, in response to receiving the network FPC command 1228 from the network entity 1206 via the NTN device 1204, transmit an uplink transmission 1230 to the network entity 1206 via the NTN device 1204 using a gradually updated FPC. The gradually updated FPC may be gradually updated over time at 1218 by performing slew rate control on its UE location and velocity. The gradually updated FPC may be gradually updated over time at 1218 by performing slew rate control on its open-loop FPC value while not addressing overlapping frequency adjustment procedures. The gradually updated FPC may be gradually updated over time at 1218 by performing slew rate control on its open-loop FPC value while addressing overlapping frequency adjustment procedures. The gradually updated FPC may be gradually updated over time at 1218 by performing gradual control of its uplink center frequency. 1404 may also be performed by the FPC component 198 of apparatus 1504 in FIG. 15.

At 1406, the UE may adjust, in response to an FPC difference value between the total FPC adjustment and an FPC adjustment value meeting or exceeding an FPC difference threshold, the total FPC adjustment such that the FPC difference value satisfies the one or more threshold requirements. The total FPC adjustment may be based on the current UE location update and the current UE velocity update and the FPC adjustment value may be based on the previous UE location update and the previous UE velocity update. For example, 1406 may be performed by the UE 1202 in FIG. 12, which may adjust, at 1216 or at 1218, in response to an FPC difference value between the total FPC adjustment and an FPC adjustment value meeting or exceeding an FPC difference threshold, the total FPC adjustment such that the FPC difference value satisfies the one or more threshold requirements. The total FPC adjustment may be based on the current UE location update and the current UE velocity update and the FPC adjustment value may be based on the previous UE location update and the previous UE velocity update. 1406 may also be performed by the FPC component 198 of apparatus 1504 in FIG. 15.

At 1408, the UE may adjust, in response to a transmission frequency error value between the total FPC adjustment and a reference frequency, other than an FPC adjustment based on an NTN node location update and an NTN node velocity update, exceeding a transmission frequency error threshold, the total FPC adjustment such that the transmission frequency error value satisfies the one or more threshold requirements. For example, 1408 may be performed by the UE 1202 in FIG. 12, which may adjust, in response to a transmission frequency error value between the total FPC adjustment and a reference frequency, other than an FPC adjustment based on an NTN node location update and an NTN node velocity update, exceeding a transmission frequency error threshold, the total FPC adjustment such that the transmission frequency error value satisfies the one or more threshold requirements. 1408 may also be performed by the FPC component 198 of apparatus 1504 in FIG. 15.

At 1410, the UE may transmit, in response to a subsequent FPC difference value between a subsequent total FPC adjustment and the total FPC adjustment meeting or exceeding a subsequent FPC difference value threshold, a subsequent uplink transmission with a subsequent frequency change having the subsequent total FPC adjustment calculated based on a subsequent UE location update and a subsequent UE velocity update. The subsequent total FPC adjustment may satisfy the one or more threshold requirements. For example, 1410 may be performed by the UE 1202 in FIG. 12, which may transmit, in response to a subsequent FPC difference value between a subsequent total FPC adjustment and the total FPC adjustment meeting or exceeding a subsequent FPC difference value threshold, a subsequent uplink transmission with a subsequent frequency change having the subsequent total FPC adjustment calculated based on a subsequent UE location update and a subsequent UE velocity update. The subsequent total FPC adjustment may satisfy the one or more threshold requirements. 1410 may also be performed by the FPC component 198 of apparatus 1504 in FIG. 15.

Figure 15:
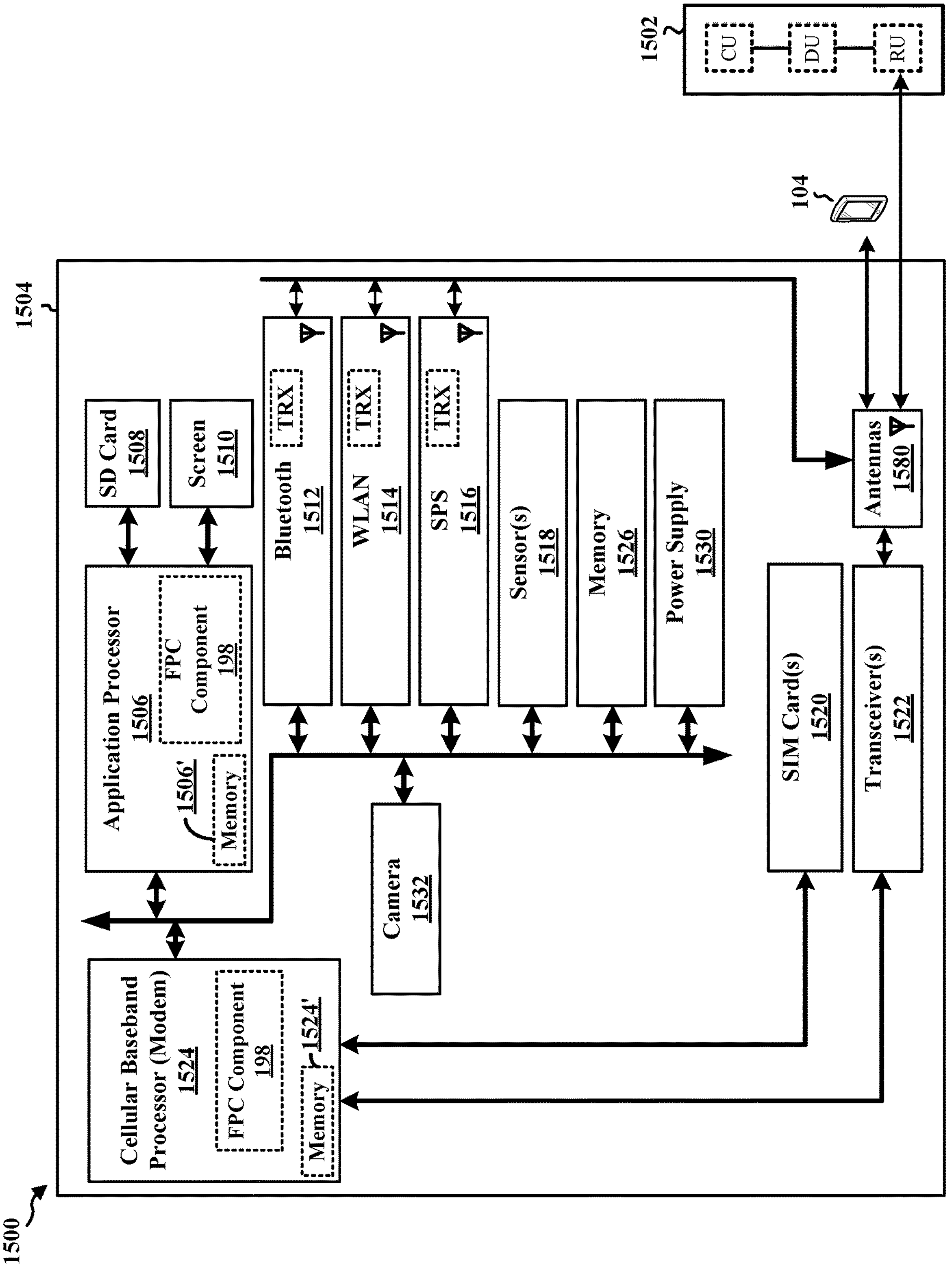
FIG. 15 is a diagram illustrating an example of a hardware implementation for an example apparatus and/or network entity, in accordance with various aspects of the present disclosure.

FIG. 15 is a diagram 1500 illustrating an example of a hardware implementation for an apparatus 1504. The apparatus 1504 may be a UE, a component of a UE, or may implement UE functionality. In some aspects, the apparatus 1404 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 is configured to receive one or more FPC commands from an NTN and transmit, in response to receiving the one or more FPC commands, an uplink transmission with a frequency change having a total FPC adjustment. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for receiving one or more FPC commands from an NTN, means for transmitting, in response to receiving the one or more FPC commands, an uplink transmission with a frequency change having a total FPC adjustment, means for weighting the intermediary UE location update based on the current UE location update, the previous UE location update, and a time since the previous UE location update, means for weighting the intermediary UE velocity update based on the current UE velocity update, the previous UE velocity update, and time since the previous UE location update, means for transmitting, in response to an FPC difference value between a current FPC adjustment and a previous FPC adjustment meeting or exceeding an FPC difference threshold, the uplink transmission with the total FPC adjustment that satisfies the one or more threshold requirements, means for basing the current FPC adjustment on the current UE location update, the current UE velocity update, a current NTN node location update, and a current NTN node velocity update, means for basing the previous FPC adjustment on the previous UE location update, the previous UE velocity update, the current NTN node location update, and the current NTN node velocity update, means for transmitting, in response to a subsequent FPC difference value between a subsequent total FPC adjustment and the total FPC adjustment meeting or exceeding a subsequent FPC difference value threshold, a subsequent uplink transmission with a subsequent frequency change having a subsequent total FPC adjustment calculated based on a subsequent UE location update and a subsequent UE velocity update, means for basing the subsequent total FPC adjustment on the subsequent UE location update, the subsequent UE velocity update, a subsequent NTN node location update, and a subsequent NTN node velocity update, and means for transmitting, in response to a transmission frequency error value between a transmission frequency of the UE and a reference frequency exceeding a transmission frequency error threshold, the uplink transmission with the total FPC adjustment that satisfies the one or more threshold requirements based on an FPC adjustment change other than an FPC adjustment based on an NTN node location update and an NTN node velocity update and a network-controlled common FPC value. The apparatus 1504 may include means for receiving one or more FPC commands from an NTN node. The apparatus 1504 may include means for transmitting, in response to receiving the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update. The apparatus 1504 may include means for weighting the intermediary UE location based on the current UE location update, the previous UE location update, and a time since the previous UE location update. The apparatus 1504 may include means for weighting the intermediary UE velocity based on the current UE velocity update, the previous UE velocity update, and time since the previous UE location update. The apparatus 1504 may include means for adjusting, in response to an FPC difference value between the total FPC adjustment and an FPC adjustment value meeting or exceeding an FPC difference threshold, the total FPC adjustment such that the FPC difference value satisfies the one or more threshold requirements. The apparatus 1504 may include means for transmitting, in response to a subsequent FPC difference value between a subsequent total FPC adjustment and the total FPC adjustment meeting or exceeding a subsequent FPC difference value threshold, a subsequent uplink transmission with a subsequent frequency change having the subsequent total FPC adjustment calculated based on a subsequent UE location update and a subsequent UE velocity update. The apparatus 1504 may include means for adjusting, in response to a transmission frequency error value between the total FPC adjustment and a reference frequency, other than an FPC adjustment based on an NTN node location update and an NTN node velocity update, exceeding a transmission frequency error threshold, the total FPC adjustment such that the transmission frequency error value satisfies the one or more threshold requirements. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
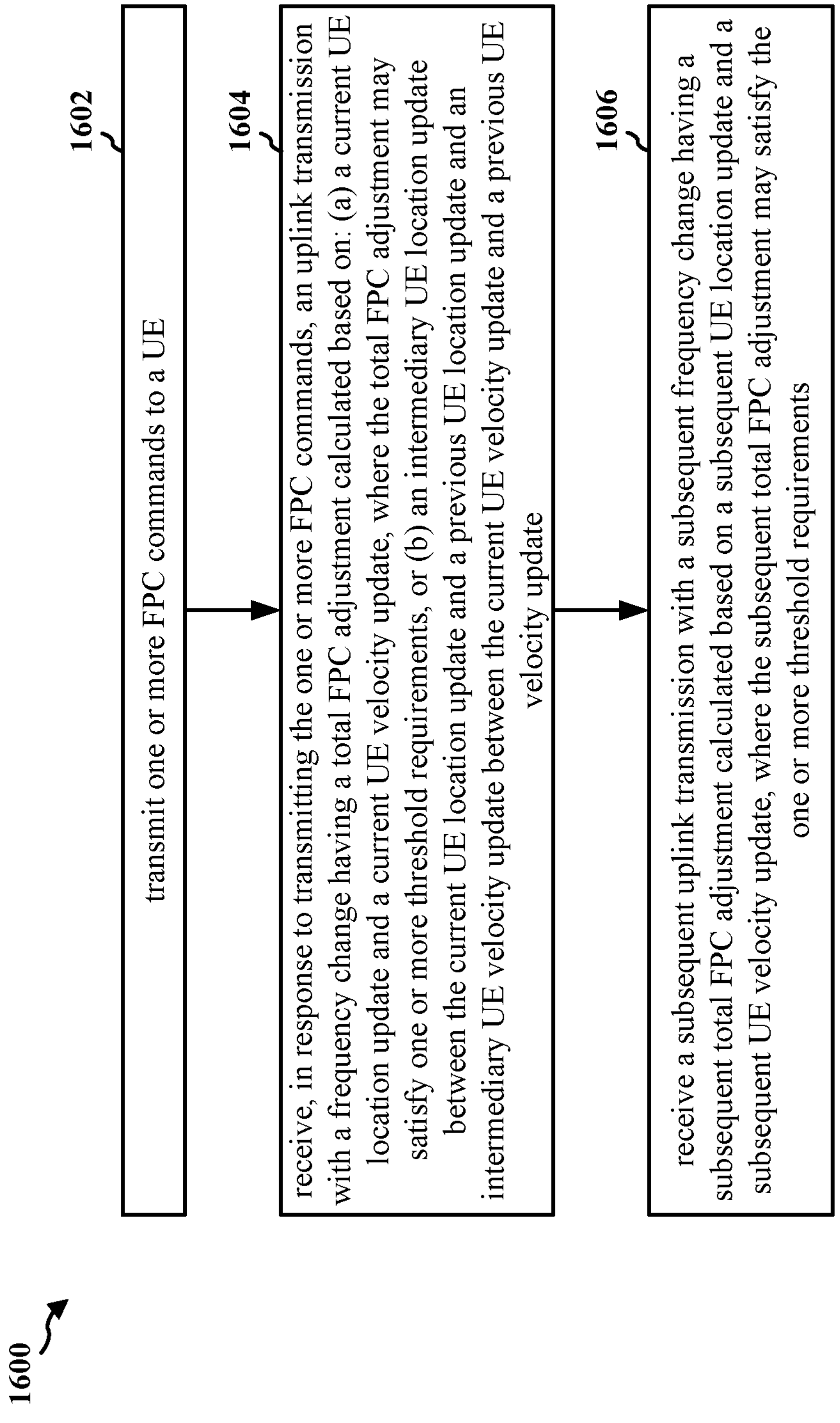
FIG. 16 is a flowchart of a method of wireless communication, in accordance with various aspects of the present disclosure.

FIG. 16 is a flowchart 1600 of a method of wireless communication. The method may be performed by an NTN node (e.g., the base station 102, the base station 310; the NTN device 402, the NTN device 502, the NTN device 504, the NTN device 1204; the NTN gateway 404; the core network 410; the RAN 412; the NTN-DU 414; the NTN-CU 416; the network entity 1502, the network entity 1702, the network entity 1860). At 1602, the NTN node may transmit one or more FPC commands to a UE. For example, 1602 may be performed by the NTN device 1204, which may transmit one or more FPC commands to the UE 1202. Moreover, 1602 may be performed by the component 199 in FIGS. 17 and 18.

At 1604, the NTN node may receive, in response to transmitting the one or more FPC commands, an uplink transmission with a frequency change having a total FPC adjustment calculated based on: (a) a current UE location update and a current UE velocity update, where the total FPC adjustment may satisfy one or more threshold requirements, or (b) an intermediary UE location update between the current UE location update and a previous UE location update and an intermediary UE velocity update between the current UE velocity update and a previous UE velocity update. For example, 1604 may be performed by the NTN device 1204, which may receive, in response to transmitting the network FPC command 1222 or the network FPC command 1228, the uplink transmission 1224 or the uplink transmission 1230. The uplink transmission 1230 may have a frequency change having a total FPC adjustment calculated based on: (a) a current UE location update and a current UE velocity update of the UE 1202, where the total FPC adjustment may satisfy one or more threshold requirements, or (b) an intermediary UE location update between the current UE location update and a previous UE location update and an intermediary UE velocity update between the current UE velocity update and a previous UE velocity update of the UE 1202. Moreover, 1604 may be performed by the component 199 in FIGS. 17 and 18.

At 1606, the NTN node may receive a subsequent uplink transmission with a subsequent frequency change having a subsequent total FPC adjustment calculated based on a subsequent UE location update and a subsequent UE velocity update. The subsequent total FPC adjustment may satisfy the one or more threshold requirements. For example, 1606 may be performed by the NTN device 1204, which may receive a subsequent uplink transmission with a subsequent frequency change having a subsequent total FPC adjustment calculated based on a subsequent UE location update and a subsequent UE velocity update. The subsequent total FPC adjustment may satisfy the one or more threshold requirements. Moreover, 1606 may be performed by the component 199 in FIGS. 17 and 18.

Figure 17:
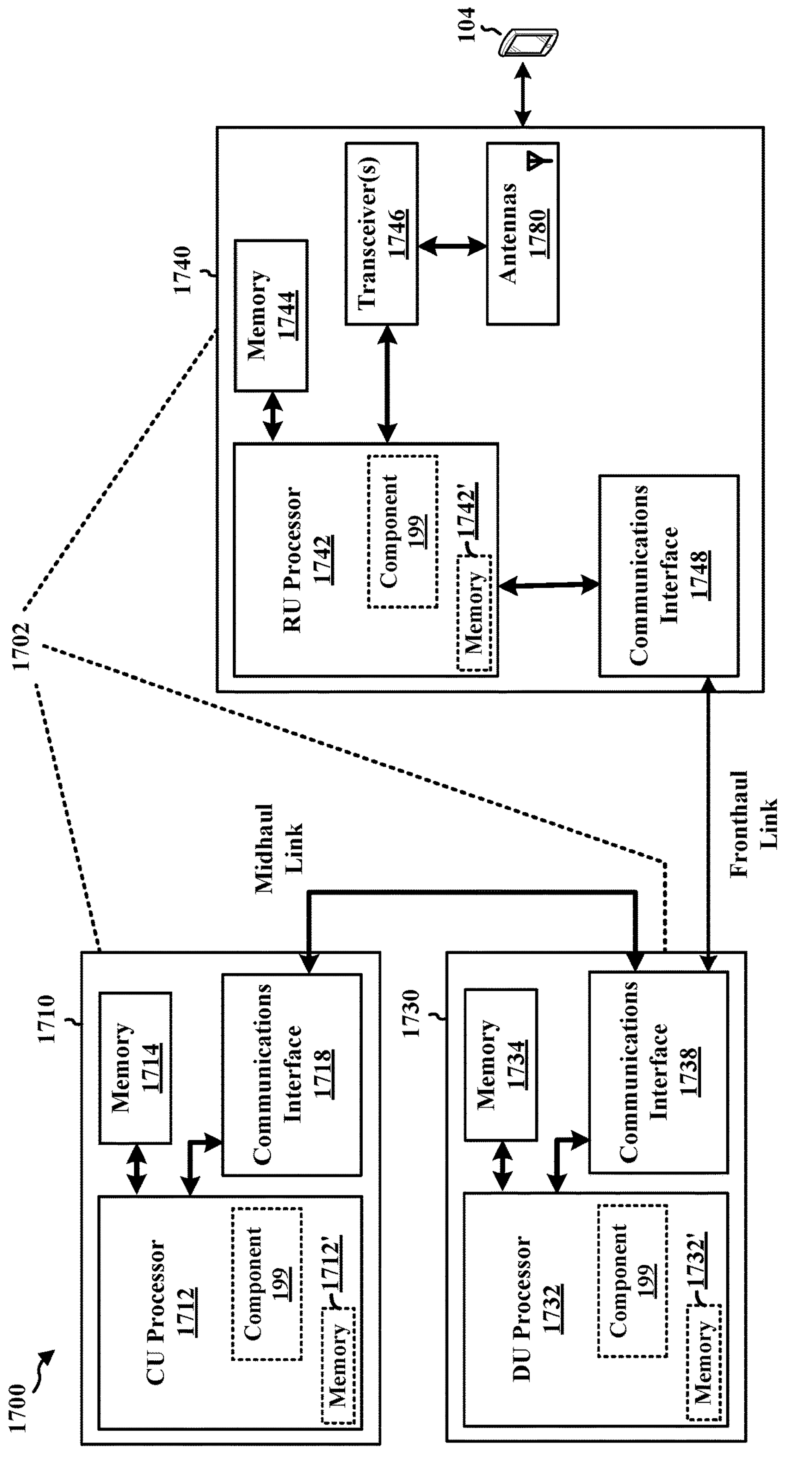
FIG. 17 is a diagram illustrating an example of a hardware implementation for an example network entity.

FIG. 17 is a diagram 1700 illustrating an example of a hardware implementation for a network entity 1702. The network entity 1702 may be a BS, a component of a BS, or may implement BS functionality. The network entity 1702 may include at least one of a CU 1710, a DU 1730, or an RU 1740. For example, depending on the layer functionality handled by the component 199, the network entity 1702 may include the CU 1710; both the CU 1710 and the DU 1730; each of the CU 1710, the DU 1730, and the RU 1740; the DU 1730; both the DU 1730 and the RU 1740; or the RU 1740. The CU 1710 may include a CU processor 1712. The CU processor 1712 may include on-chip memory 1712'. In some aspects, the CU 1710 may further include additional memory modules 1714 and a communications interface 1718. The CU 1710 communicates with the DU 1730 through a midhaul link, such as an F1 interface. The DU 1730 may include a DU processor 1732. The DU processor 1732 may include on-chip memory 1732'. In some aspects, the DU 1730 may further include additional memory modules 1734 and a communications interface 1738. The DU 1730 communicates with the RU 1740 through a fronthaul link. The RU 1740 may include an RU processor 1742. The RU processor 1742 may include on-chip memory 1742'. In some aspects, the RU 1740 may further include additional memory modules 1744, one or more transceivers 1746, antennas 1780, and a communications interface 1748. The RU 1740 communicates with the UE 104. The on-chip memory 1712', 1732', 1742' and the additional memory modules 1714, 1734, 1744 may each be considered a computer-readable medium/memory. Each computer-readable medium/memory may be non-transitory. Each of the processors 1712, 1732, 1742 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit one or more FPC commands to a UE. The component 199 may be configured to receive, in response to transmitting the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update. The component 199 may be within one or more processors of one or more of the CU 1710, DU 1730, and the RU 1740. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1702 may include a variety of components configured for various functions. In one configuration, the network entity 1702 may include means for transmitting one or more FPC commands to a UE. The network entity 1702 may include means for receiving, in response to transmitting the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update. The network entity 1702 may include means for receiving a subsequent uplink transmission with a subsequent frequency change having a subsequent total FPC adjustment calculated based on a subsequent UE location update and a subsequent UE velocity update. The means may be the component 199 of the network entity 1702 configured to perform the functions recited by the means. As described supra, the network entity 1702 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 18:
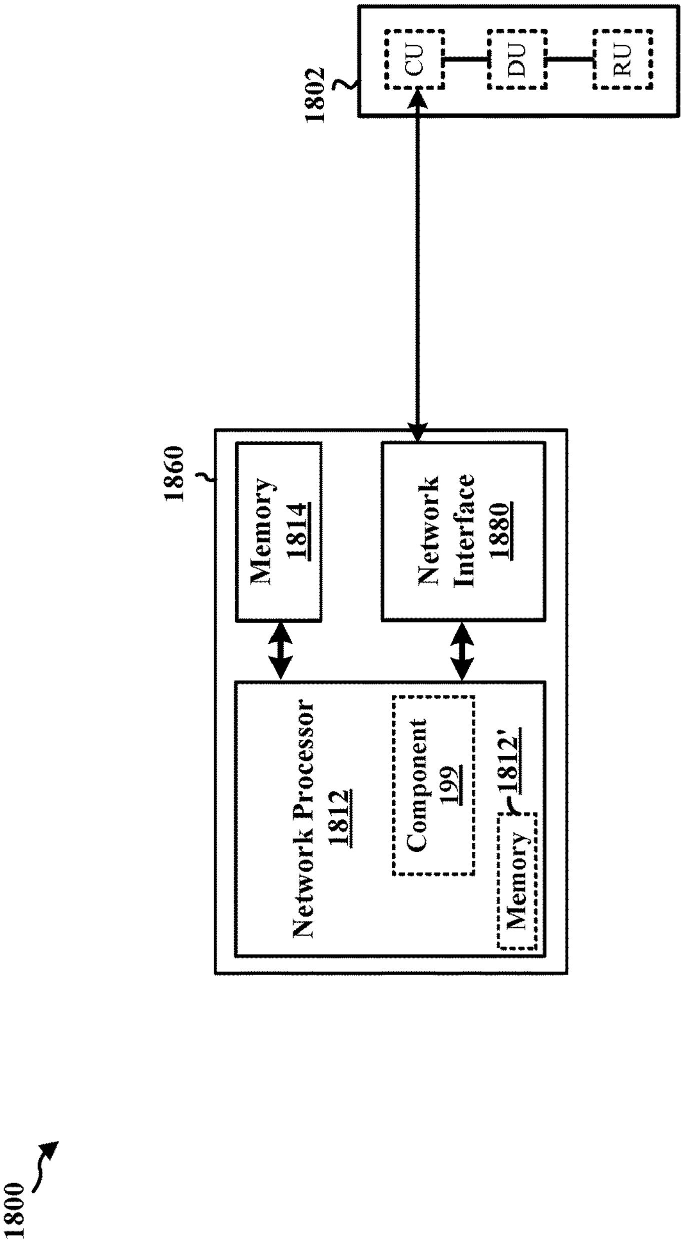
FIG. 18 is a diagram illustrating an example of a hardware implementation for an example network entity.

FIG. 18 is a diagram 1800 illustrating an example of a hardware implementation for a network entity 1860. In one example, the network entity 1860 may be within the core network 120. The network entity 1860 may include a network processor 1812. The network processor 1812 may include on-chip memory 1812'. In some aspects, the network entity 1860 may further include additional memory modules 1814. The network entity 1860 communicates via the network interface 1880 directly (e.g., backhaul link) or indirectly (e.g., through a RIC) with the CU 1802. The on-chip memory 1812' and the additional memory modules 1814 may each be considered a computer-readable medium/memory. Each computer-readable medium/memory may be non-transitory. The processor 1812 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit one or more FPC commands to a UE. The component 199 may be configured to receive, in response to transmitting the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update. The component 199 may be within the processor 1812. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1860 may include a variety of components configured for various functions. In one configuration, the network entity 1860 may include means for transmitting one or more FPC commands to a UE. The network entity 1860 may include means for receiving, in response to transmitting the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update. The network entity 1860 may include means for receiving a subsequent uplink transmission with a subsequent frequency change having a subsequent total FPC adjustment calculated based on a subsequent UE location update and a subsequent UE velocity update. The means may be the component 199 of the network entity 1860 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including receiving one or more FPC commands from an NTN node. The method may further include transmitting, in response to receiving the one or more FPC commands, an uplink transmission with a frequency change having a total FPC adjustment calculated based on (a) a current UE location update and a current UE velocity update, where the total FPC adjustment satisfies one or more threshold requirements, or (b) an intermediary UE location update between the current UE location update and a previous UE location update and an intermediary UE velocity update between the current UE velocity update and a previous UE velocity update.

Aspect 2 is the method of aspect 1, where the intermediary UE location update may be weighted based on the current UE location update, the previous UE location update, and a time since the previous UE location update. The intermediary UE velocity update may also be weighted based on the current UE velocity update, the previous UE velocity update, and t time since the previous UE location update.

Aspect 3 is the method of any of aspects 1 and 2, further including, in response to an FPC difference value between the total FPC adjustment and an FPC adjustment value meeting or exceeding an FPC difference threshold, adjusting the total FPC adjustment such that the FPC difference value satisfies the one or more threshold requirements. The total FPC adjustment value may be based on the current UE location update and the current UE velocity update and the FPC adjustment value is based on the previous UE location update and the previous UE velocity update.

Aspect 4 is the method of aspect 3, where the total FPC adjustment may be based on the current UE location update, the current UE velocity update, a current NTN node location update, and a current NTN node velocity update. The FPC adjustment value may be based on the previous UE location update, the previous UE velocity update, the current NTN node location update, and the current NTN node velocity update.

Aspect 5 is the method of any of aspects 3 to 4, where the one or more threshold requirements includes at least one of (a) a maximum amount of magnitude of the FPC difference value for a single adjustment for the uplink transmission that does not exceed a first threshold value, (b) a minimum aggregate adjustment rate of a sum of the FPC difference value and a first set of FPC adjustments over a first period of time that meets or exceeds a second threshold value, or (c) a maximum aggregate adjustment rate of a sum of the FPC difference value and a second set of FPC adjustments over a second period of time that meets or does not exceed a third threshold value.

Aspect 6 is the method of aspect 5, where the first threshold value includes the FPC difference threshold, the second threshold value includes a first multiple of 0.5 seconds, and the third threshold value includes a second multiple of 100 ms.

Aspect 7 is the method of any of aspects 3 to 6, further including, in response to a subsequent FPC difference value between a subsequent total FPC adjustment and the total FPC adjustment meeting or exceeding a subsequent FPC difference value threshold, transmitting a subsequent uplink transmission with a subsequent frequency change having the subsequent total FPC adjustment calculated based on a subsequent UE location update and a subsequent UE velocity update. The subsequent total FPC adjustment may satisfy the one or more threshold requirements.

Aspect 8 is the method of aspect 7, where the subsequent total FPC adjustment is based on the subsequent UE location update, the subsequent UE velocity update, a subsequent NTN node location update, and a subsequent NTN node velocity update.

Aspect 9 is the method of any of aspects 7 to 8, where the one or more threshold requirements include at least one of (a) a maximum amount of magnitude of the subsequent FPC difference value for a single adjustment for the subsequent uplink transmission that does not exceed a first threshold value, (b) a minimum aggregate adjustment rate of a sum of the subsequent FPC difference value and a first set of FPC adjustments over a first period of time that meets or exceeds a second threshold value, or (c) a maximum aggregate adjustment rate of a sum of the subsequent FPC difference value and a second set of FPC adjustments over a second period of time that does not exceed a third threshold value.

Aspect 10 is the method of any of aspects 1 to 9, further including, in response to a transmission frequency error value between the total FPC adjustment and a reference frequency, other than an FPC adjustment based on an NTN node location update and an NTN node velocity update, exceeding a transmission frequency error threshold, adjusting the total FPC adjustment such that the transmission frequency error value satisfies the one or more threshold requirements.

Aspect 11 is the method of aspect 10, where the one or more threshold requirements include at least one of (a) a maximum amount of magnitude of transmission frequency error value for a single adjustment for the uplink transmission, other than the FPC adjustment based on the NTN node location update and the NTN node velocity update, that does not exceed a first threshold value, (b) a minimum aggregate adjustment rate of a sum of the transmission frequency error value, other than the FPC adjustment based on the NTN node location update and the NTN node velocity update, and a first set of FPC adjustments, other than FPC adjustments based on NTN node location updates and NTN node velocity updates, over a first period of time that meets or exceeds a second threshold value, or (c) a maximum aggregate adjustment rate of a sum of the transmission frequency error value, other than the FPC adjustment based on the NTN node location update and the NTN node velocity update, and a second set of FPC adjustments, other than FPC adjustments based on NTN node location updates and NTN node velocity updates, over a second period of time that meets or does not exceed a third threshold value.

Aspect 12 is the method of any of aspects 10 to 11, where the total FPC adjustment is based on $F_{FPC\_CLOSED}+F_{FPC\_OPEN}+F_{FPC\_OFFSET}+F_{DL}*(f_{UL}/f_{DL})$, $F_{FPC\_CLOSED}$ includes a closed-loop FPC value received from the NTN node, $F_{FPC\_OPEN}$ includes an open-loop FPC value based on the current UE location update, the current UE velocity update, the NTN node location update, and the NTN node velocity update, $F_{FPC\_OFFSET}$ includes a fixed offset, $F_{DL}$ includes a first center frequency of a received transmission from the NTN node, $f_{UL}$ includes a second center frequency of an ideal uplink transmission, and $f_{DL}$ includes a third center frequency of an ideal downlink transmission.

Aspect 13 is the method of any of aspects 1 to 12, where the total FPC adjustment is based on $F_{FPC\_CLOSED}+F_{FPC\_OPEN}+F_{FPC\_OFFSET}$, $F_{FPC\_CLOSED}$ includes a closed-loop FPC value received from the NTN node, $F_{FPC\_OPEN}$ includes an open-loop FPC value based on the current UE location update, the current UE velocity update, an NTN node location update, and an NTN node velocity update, and $F_{FPC\_OFFSET}$ includes a fixed offset.

Aspect 14 is a method of wireless communication at a UE, where the method may include receiving one or more FPC commands from an NTN node. The method may include transmitting, in response to receiving the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update.

Aspect 15 is the method of aspect 14, where the method may include weighting the intermediary UE location based on the current UE location update, the previous UE location update, and a time since the previous UE location update. The method may include weighting the intermediary UE velocity based on the current UE velocity update, the previous UE velocity update, and time since the previous UE location update.

Aspect 16 is the method of either of aspects 14 or 15, where the method may include adjusting, in response to an FPC difference value between the total FPC adjustment and an FPC adjustment value meeting or exceeding an FPC difference threshold, the total FPC adjustment such that the FPC difference value satisfies the one or more threshold requirements. The total FPC adjustment value may be based on the current UE location update and the current UE velocity update. The FPC adjustment value may be based on the previous UE location update and the previous UE velocity update.

Aspect 17 is the method of aspect 16, where the total FPC adjustment may be based on the current UE location update, the current UE velocity update, a current NTN node location update, and a current NTN node velocity update. The FPC adjustment value may be based on the previous UE location update, the previous UE velocity update, the current NTN node location update, and the current NTN node velocity update.

Aspect 18 is the method of either of aspects 16 or 17, where the one or more threshold requirements may include at least one of: (a) a maximum amount of magnitude of the FPC difference value for a single adjustment for the uplink transmission that does not exceed a first threshold value, (b) a minimum aggregate adjustment rate of a sum of the FPC difference value and a first set of FPC adjustments over a first period of time that meets or exceeds a second threshold value, or (c) a maximum aggregate adjustment rate of a sum of the FPC difference value and a second set of FPC adjustments over a second period of time that does not exceed a third threshold value.

Aspect 19 is the method of any of aspects 16 to 18, where the method may include transmitting, in response to a subsequent FPC difference value between a subsequent total FPC adjustment and the total FPC adjustment meeting or exceeding a subsequent FPC difference value threshold, a subsequent uplink transmission with a subsequent frequency change having the subsequent total FPC adjustment calculated based on a subsequent UE location update and a subsequent UE velocity update. The subsequent total FPC adjustment may satisfy the one or more threshold requirements.

Aspect 20 is the method of aspect 19, where the subsequent total FPC adjustment may be based on the subsequent UE location update, the subsequent UE velocity update, a subsequent NTN node location update, and a subsequent NTN node velocity update.

Aspect 21 is the method of aspect 20, where the one or more threshold requirements may include at least one of: (a) a maximum amount of magnitude of the subsequent FPC difference value for a single adjustment for the subsequent uplink transmission that does not exceed a first threshold value, (b) a minimum aggregate adjustment rate of a sum of the subsequent FPC difference value and a first set of FPC adjustments over a first period of time that meets or exceeds a second threshold value, or (c) a maximum aggregate adjustment rate of a sum of the subsequent FPC difference value and a second set of FPC adjustments over a second period of time that does not exceed a third threshold value.

Aspect 22 is the method of any of aspects 14 to 21, where the method may include adjusting, in response to a transmission frequency error value between the total FPC adjustment and a reference frequency, other than an FPC adjustment based on an NTN node location update and an NTN node velocity update, exceeding a transmission frequency error threshold, the total FPC adjustment such that the transmission frequency error value satisfies the one or more threshold requirements.

Aspect 23 is the method of aspect 22, where the one or more threshold requirements may include at least one of (a) a maximum amount of magnitude of the transmission frequency error value for a single adjustment for the uplink transmission, other than the FPC adjustment based on the NTN node location update and the NTN node velocity update, that does not exceed a first threshold value, (b) a minimum aggregate adjustment rate of a sum of the transmission frequency error value, other than the FPC adjustment based on the NTN node location update and the NTN node velocity update, and a first set of FPC adjustments, other than FPC adjustments based on NTN node location updates and NTN node velocity updates, over a first period of time that meets or exceeds a second threshold value, or (c) a maximum aggregate adjustment rate of a sum of the transmission frequency error value, other than the FPC adjustment based on the NTN node location update and the NTN node velocity update, and a second set of FPC adjustments, other than FPC adjustments based on NTN node location updates and NTN node velocity updates, over a second period of time that does not exceed a third threshold value.

Aspect 24 is the method of either of aspects 22 or 23, where the total FPC adjustment may be based on $F_{FPC\_CLOSED}+F_{FPC\_OPEN}+F_{FPC\_OFFSET}+F_{DL}*(f_{UL}/f_{DL})$. $F_{FPC\_CLOSED}$ may include a closed-loop FPC value received from the NTN node. $F_{FPC\_OPEN}$ may include an open-loop FPC value based on the current UE location update, the current UE velocity update, the NTN node location update, and the NTN node velocity update. $F_{FPC\_OFFSET}$ may include a fixed offset. $F_{DL}$ may include a first center frequency of a received transmission from the NTN node. $f_{UL}$ may include a second center frequency of an ideal uplink transmission. $f_{DL}$ may include a third center frequency of an ideal downlink transmission.

Aspect 25 is the method of any of aspects 14 to 24, where the total FPC adjustment may be based on $F_{FPC\_CLOSED}+F_{FPC\_OPEN}+F_{FPC\_OFFSET}$. $F_{FPC\_CLOSED}$ may include a closed-loop FPC value received from the NTN node. $F_{FPC\_OPEN}$ may include an open-loop FPC value based on the current UE location update, the current UE velocity update, an NTN node location update, and an NTN node velocity update. $F_{FPC\_OFFSET}$ may include a fixed offset.

Aspect 26 is a method of wireless communication at an NTN node, where the method may include transmitting one or more FPC commands to a UE. The method may include receiving, in response to transmitting the one or more FPC commands, an uplink transmission with a frequency change having a total FPC adjustment calculated based on (a) a current UE location update and a current UE velocity update, where the total FPC adjustment may satisfy one or more threshold requirements, or (b) an intermediary UE location between the current UE location update and a previous UE location update and an intermediary UE velocity between the current UE velocity update and a previous UE velocity update.

Aspect 27 is the method of aspect 26, where the intermediary UE location may be weighted based on the current UE location update, the previous UE location update, and a time since the previous UE location update. The intermediary UE velocity may be weighted based on the current UE velocity update, the previous UE velocity update, and time since the previous UE location update.

Aspect 28 is the method of either aspect 26 or 27, where the total FPC adjustment may be adjusted such that an FPC difference value between the total FPC adjustment and an FPC adjustment value satisfies the one or more threshold requirements. The total FPC adjustment may be based on the current UE location update and the current UE velocity update and the FPC adjustment value may be based on the previous UE location update and the previous UE velocity update.

Aspect 29 is the method of aspect 28, where the total FPC adjustment may be based on the current UE location update, the current UE velocity update, a current NTN node location update, and a current NTN node velocity update. The FPC adjustment value may be based on the previous UE location update, the previous UE velocity update, the current NTN node location update, and the current NTN node velocity update.

Aspect 30 is the method of either of aspects 28 or 29, where the one or more threshold requirements may include at least one of (a) a maximum amount of magnitude of the FPC difference value for a single adjustment for the uplink transmission that does not exceed a first threshold value, (b) a minimum aggregate adjustment rate of a first sum of the FPC difference value and a first set of FPC adjustments over a first period of time that meets or exceeds a second threshold value, or (c) a maximum aggregate adjustment rate of a second sum of the FPC difference value and a second set of FPC adjustments over a second period of time that meets or does not exceed a third threshold value.

Aspect 31 is the method of any of aspects 28 to 30, where the method may include receiving a subsequent uplink transmission with a subsequent frequency change having a subsequent total FPC adjustment calculated based on a subsequent UE location update and a subsequent UE velocity update. The subsequent total FPC adjustment may satisfy the one or more threshold requirements.

Aspect 32 is the method of aspect 31, where the subsequent total FPC adjustment may be based on the subsequent UE location update, the subsequent UE velocity update, a subsequent NTN node location update, and a subsequent NTN node velocity update.

Aspect 33 is the method of either of aspects 31 or 32, where the one or more threshold requirements may include at least one of (a) a maximum amount of magnitude of a subsequent FPC difference value for a single adjustment for the subsequent uplink transmission that does not exceed a first threshold value, (b) a minimum aggregate adjustment rate of a first sum of the subsequent FPC difference value and a first set of FPC adjustments over a first period of time that meets or exceeds a second threshold value, or (c) a maximum aggregate adjustment rate of a second sum of the subsequent FPC difference value and a second set of FPC adjustments over a second period of time that meets or does not exceed a third threshold value.

Aspect 34 is the method of any of aspects 26 to 33, where the total FPC adjustment may be adjusted such that a transmission frequency error value satisfies the one or more threshold requirements.

Aspect 35 is the method of aspect 34, where the one or more threshold requirements may include at least one of (a) a maximum amount of magnitude of the transmission frequency error value for a single adjustment for the uplink transmission, other than an FPC adjustment based on an NTN node location update and an NTN node velocity update, that does not exceed a first threshold value, (b) a minimum aggregate adjustment rate of a first sum of the transmission frequency error value, other than the FPC adjustment based on the NTN node location update and the NTN node velocity update, and a first set of FPC adjustments, other than FPC adjustments based on NTN node location updates and NTN node velocity updates, over a first period of time that meets or exceeds a second threshold value, (c)

a maximum aggregate adjustment rate of a second sum of the transmission frequency error value, other than the FPC adjustment based on the NTN node location update and the NTN node velocity update, and a second set of FPC adjustments, other than FPC adjustments based on NTN node location updates and NTN node velocity updates, over a second period of time that meets or does not exceed a third threshold value.

Aspect 36 is the method of either of aspects 34 or 35, where the total FPC adjustment may be based on $F_{FPC\_CLOSED}+F_{FPC\_OPEN}+F_{FPC\_OFFSET}+F_{DL}*(f_{UL}/f_{DL})$. $F_{FPC\_CLOSED}$ may include a closed-loop FPC value received from the NTN node. $F_{FPC\_OPEN}$ may include an open-loop FPC value based on the current UE location update, the current UE velocity update, an NTN node location update, and an NTN node velocity update. $F_{FPC\_OFFSET}$ may include a fixed offset. $F_{DL}$ may include a first center frequency of a received transmission from the NTN node. $f_{UL}$ may include a second center frequency of an ideal uplink transmission. $f_{DL}$ may include a third center frequency of an ideal downlink transmission.

Aspect 37 is the method of any of aspects 26 to 36, where the total FPC adjustment may be based on $F_{FPC\_CLOSED}+F_{FPC\_OPEN}+F_{FPC\_OFFSET}$. $F_{FPC\_CLOSED}$ may include a closed-loop FPC value received from the NTN node. $F_{FPC\_OPEN}$ may include an open-loop FPC value based on the current UE location update, the current UE velocity update, an NTN node location update, and an NTN node velocity update. $F_{FPC\_OFFSET}$ may include a fixed offset.

Aspect 38 is an apparatus for wireless communication, including: a memory; and at least one processor coupled to the memory and, based at least in part on information stored in the memory, the at least one processor is configured to implement any of aspects 1 to 37.

Aspect 39 is the apparatus of aspect 38, further including at least one of an antenna or a transceiver coupled to the at least one processor.

Aspect 40 is an apparatus for wireless communication including means for implementing any of aspects 1 to 37.

Aspect 41 is a computer-readable medium (e.g., a non-transitory computer-readable medium) storing computer executable code, where the code when executed by a processor causes the processor to implement any of aspects 1 to 37.

What is claimed is:

1. An apparatus for wireless communication at a user equipment (UE), comprising:

memory; and at least one processor coupled to the memory and, based at least in part on information stored in the memory, the at least one processor is configured to:

receive one or more frequency pre-compensation (FPC) commands from a non-terrestrial network (NTN) node;

adjust a first total FPC adjustment to satisfy one or more threshold requirements, wherein the first total FPC adjustment is based on a current UE location update and a current UE velocity update; or determine a second total FPC adjustment based on an intermediary UE location between the current UE location update and a previous UE location update and an intermediary UE velocity between the current UE velocity update and a previous UE velocity update; and transmit, in response to receiving the one or more FPC commands, an uplink transmission with a frequency change based on the adjusted first total FPC adjustment or the determined second total FPC adjustment.

2. The apparatus of claim 1, wherein the at least one processor is configured to:

weight the intermediary UE location based on the current UE location update, the previous UE location update, and a time since the previous UE location update;

weight the intermediary UE velocity based on the current UE velocity update, the previous UE velocity update, and time since the previous UE location update; and determine the first total FPC adjustment based on the weighted intermediary UE location and the weighted intermediary UE velocity.

3. The apparatus of claim 1, wherein the at least one processor is further configured to:

determine the first total FPC adjustment based on the current UE location update and the current UE velocity update; and determine an FPC adjustment value based on the previous UE location update and the previous UE velocity update, wherein, to adjust the first total FPC adjustment to satisfy the one or more threshold requirements, the at least one processor is configured to:

adjust, in response to an FPC difference value between the determined first total FPC adjustment and the determined FPC adjustment value meeting or exceeding an FPC difference threshold, the first total FPC adjustment such that the FPC difference value satisfies the one or more threshold requirements.

4. The apparatus of claim 3, wherein, to determine the first total FPC adjustment based on the current UE location update and the current UE velocity update, the at least one processor is configured to:

determine the first total FPC adjustment further based on, a current NTN node location update, and a current NTN node velocity update.

5. The apparatus of claim 3, wherein the one or more threshold requirements comprise at least one of:

a maximum amount of magnitude of the FPC difference value for a single adjustment for the uplink transmission that does not exceed a first threshold value;

a minimum aggregate adjustment rate of a first sum of the FPC difference value and a first set of FPC adjustments over a first period of time that meets or exceeds a second threshold value; or a maximum aggregate adjustment rate of a second sum of the FPC difference value and a second set of FPC adjustments over a second period of time that meets or does not exceed a third threshold value.

6. The apparatus of claim 3, wherein the at least one processor is further configured to:

determine a subsequent total FPC adjustment based on a subsequent UE location update and a subsequent UE velocity update;

adjust the determined subsequent total FPC adjustment to satisfy the one or more threshold requirements; and transmit, in response to a subsequent FPC difference value between the adjusted subsequent total FPC adjustment and the adjusted total FPC adjustment meeting or exceeding a subsequent FPC difference value threshold, a subsequent uplink transmission with a subsequent frequency change based on the adjusted subsequent total FPC adjustment.

7. The apparatus of claim 6, wherein, to determine the subsequent total FPC adjustment based on the subsequent UE location update and the subsequent UE velocity update, the at least one processor is configured to:

determine the subsequent total FPC adjustment based on the subsequent UE location update, the subsequent UE velocity update, a subsequent NTN node location update, and a subsequent NTN node velocity update.

8. The apparatus of claim 6, wherein the one or more threshold requirements comprise at least one of:

a maximum amount of magnitude of the subsequent FPC difference value for a single adjustment for the subsequent uplink transmission that does not exceed a first threshold value;

a minimum aggregate adjustment rate of a first sum of the subsequent FPC difference value and a first set of FPC adjustments over a first period of time that meets or exceeds a second threshold value; or a maximum aggregate adjustment rate of a second sum of the subsequent FPC difference value and a second set of FPC adjustments over a second period of time that meets or does not exceed a third threshold value.

9. The apparatus of claim 1, wherein, to adjust the first total FPC adjustment to satisfy the one or more threshold requirements, the at least one processor is configured to:

adjust, in response to a transmission frequency error value between the first total FPC adjustment and a reference frequency, other than an FPC adjustment based on an NTN node location update and an NTN node velocity update, exceeding a transmission frequency error threshold, the first total FPC adjustment such that the transmission frequency error value satisfies the one or more threshold requirements.

10. The apparatus of claim 9, wherein the one or more threshold requirements comprise at least one of:

a maximum amount of magnitude of the transmission frequency error value for a single adjustment for the uplink transmission, other than the FPC adjustment based on the NTN node location update and the NTN node velocity update, that does not exceed a first threshold value;

a minimum aggregate adjustment rate of a first sum of the transmission frequency error value, other than the FPC adjustment based on the NTN node location update and the NTN node velocity update, and a first set of FPC adjustments, other than FPC adjustments based on NTN node location updates and NTN node velocity updates, over a first period of time that meets or exceeds a second threshold value, or a maximum aggregate adjustment rate of a second sum of the transmission frequency error value, other than the FPC adjustment based on the NTN node location update and the NTN node velocity update, and a second set of FPC adjustments, other than the FPC adjustments based on the NTN node location updates and the NTN node velocity updates, over a second period of time that meets or does not exceed a third threshold value.

11. The apparatus of claim 9, wherein the at least one processor is configured to:

determine the first total FPC adjustment based on $F_{FPC\_CLOSED}+F_{FPC\_OPEN}+F_{FPC\_OFFSET}+F_{DL}*(f_{UL}/f_{DL})$, wherein $F_{FPC\_CLOSED}$ comprises a closed-loop FPC value received from the NTN node, $F_{FPC\_OPEN}$ comprises an open-loop FPC value based on the current UE location update, the current UE velocity update, the NTN node location update, and the NTN node velocity update, $F_{FPC\_OFFSET}$ comprises a fixed offset, $F_{DL}$ comprises a first center frequency of a received transmission from the NTN node, $f_{UL}$ comprises a second center frequency of an ideal uplink transmission, and $f_{DL}$ comprises a third center frequency of an ideal downlink transmission.

12. The apparatus of claim 1, wherein the at least one processor is configured to:

determine the first total FPC adjustment based on $F_{FPC\_CLOSED}+F_{FPC\_OPEN}+F_{FPC\_OFFSET}$, wherein $F_{FPC\_CLOSED}$ comprises a closed-loop FPC value received from the NTN node, $F_{FPC\_OPEN}$ comprises an open-loop FPC value based on the current UE location update, the current UE velocity update, an NTN node location update, and an NTN node velocity update, and $F_{FPC\_OFFSET}$ comprises a fixed offset.

13. The apparatus of claim 1, further comprising a transceiver coupled to the at least one processor, wherein, to receive the one or more FPC commands from the NTN node, the at least one processor is further configured to:

receive, via the transceiver, the one or more FPC commands from the NTN node.

14. An apparatus for wireless communication at a non-terrestrial network (NTN) node, comprising:

memory; and at least one processor coupled to the memory and, based at least in part on information stored in the memory, the at least one processor is configured to:

transmit one or more frequency pre-compensation (FPC) commands to a user equipment (UE); and receive, in response to transmitting the one or more FPC commands, an uplink transmission with a frequency change based on:

an adjustment of a first total FPC adjustment to satisfy one or more threshold requirements, wherein the first total FPC adjustment is based on a current UE location update and a current UE velocity update and, or a determination of a second total FPC adjustment based on an intermediary UE location between the current UE location update and a previous UE location update and an intermediary UE velocity between the current UE velocity update and a previous UE velocity update.

15. The apparatus of claim 14, wherein the intermediary UE location is weighted based on the current UE location update, the previous UE location update, and a time since the previous UE location update, wherein the intermediary UE velocity is weighted based on the current UE velocity update, the previous UE velocity update, and time since the previous UE location update.

16. The apparatus of claim 14, wherein the adjustment of the first total FPC adjustment to satisfy the one or more threshold requirements comprises the adjustment of the first total FPC adjustment such that an FPC difference value between the first total FPC adjustment and an FPC adjustment value satisfies the one or more threshold requirements, wherein the FPC adjustment value is based on the previous UE location update and the previous UE velocity update.

17. The apparatus of claim 16, wherein of the first total FPC adjustment is further based on a current NTN node location update, and a current NTN node velocity update, wherein the FPC adjustment value is based on the previous UE location update, the previous UE velocity update, the current NTN node location update, and the current NTN node velocity update.

18. The apparatus of claim 16, wherein the one or more threshold requirements comprise at least one of:
a maximum amount of magnitude of the FPC difference value for a single adjustment for the uplink transmission that does not exceed a first threshold value;
a minimum aggregate adjustment rate of a first sum of the FPC difference value and a first set of FPC adjustments over a first period of time that meets or exceeds a second threshold value; or
a maximum aggregate adjustment rate of a second sum of the FPC difference value and a second set of FPC adjustments over a second period of time that meets or does not exceed a third threshold value.

19. The apparatus of claim 16, wherein the at least one processor is further configured to:
receive a subsequent uplink transmission with a subsequent frequency change based on:
a second determination of a subsequent total FPC adjustment based on a subsequent UE location update and a subsequent UE velocity update; and
a second adjustment of the subsequent total FPC adjustment to satisfy the one or more threshold requirements.

20. The apparatus of claim 19, wherein the second adjustment of the subsequent total FPC adjustment is based on the subsequent UE location update, the subsequent UE velocity update, a subsequent NTN node location update, and a subsequent NTN node velocity update.

21. The apparatus of claim 19, wherein the one or more threshold requirements comprise at least one of:
a maximum amount of magnitude of a subsequent FPC difference value for a single adjustment for the subsequent uplink transmission that does not exceed a first threshold value;
a minimum aggregate adjustment rate of a first sum of the subsequent FPC difference value and a first set of FPC adjustments over a first period of time that meets or exceeds a second threshold value; or
a maximum aggregate adjustment rate of a second sum of the subsequent FPC difference value and a second set of FPC adjustments over a second period of time that meets or does not exceed a third threshold value.

22. The apparatus of claim 14, wherein the adjustment of the first total FPC adjustment to satisfy the one or more threshold requirements comprises the adjustment of the first total FPC adjustment such that a transmission frequency error value satisfies the one or more threshold requirements.

23. The apparatus of claim 22, wherein the one or more threshold requirements comprise at least one of:
a maximum amount of magnitude of the transmission frequency error value for a single adjustment for the uplink transmission, other than an FPC adjustment based on an NTN node location update and an NTN node velocity update, that does not exceed a first threshold value;
a minimum aggregate adjustment rate of a first sum of the transmission frequency error value, other than the FPC adjustment based on the NTN node location update and the NTN node velocity update, and a first set of FPC adjustments, other than FPC adjustments based on NTN node location updates and NTN node velocity updates, over a first period of time that meets or exceeds a second threshold value, or
a maximum aggregate adjustment rate of a second sum of the transmission frequency error value, other than the FPC adjustment based on the NTN node location update and the NTN node velocity update, and a second set of FPC adjustments, other than the FPC adjustments based on the NTN node location updates and the NTN node velocity updates, over a second period of time that meets or does not exceed a third threshold value.

24. The apparatus of claim 22, wherein the first total FPC adjustment is further based on $F_{FPC\_CLOSED}+F_{FPC\_OPEN}+F_{FPC\_OFFSET}+F_{DL}*(f_{UL}/f_{DL})$, wherein $F_{FPC\_CLOSED}$ comprises a closed-loop FPC value received from the NTN node, $F_{FPC\_OPEN}$ comprises an open-loop FPC value based on the current UE location update, the current UE velocity update, an NTN node location update, and an NTN node velocity update, $F_{FPC\_OFFSET}$ comprises a fixed offset, $F_{DL}$ comprises a first center frequency of a received transmission from the NTN node, $f_{UL}$ comprises a second center frequency of an ideal uplink transmission, and $f_{DL}$ comprises a third center frequency of an ideal downlink transmission.

25. The apparatus of claim 14, wherein the first total FPC adjustment is further based on $F_{FPC\_CLOSED}+F_{FPC\_OPEN}+F_{FPC\_OFFSET}$, wherein $F_{FPC\_CLOSED}$ comprises a closed-loop FPC value received from the NTN node, $F_{FPC\_OPEN}$ comprises an open-loop FPC value based on the current UE location update, the current UE velocity update, an NTN node location update, and an NTN node velocity update, and $F_{FPC\_OFFSET}$ comprises a fixed offset.

26. The apparatus of claim 14, further comprising a transceiver coupled to the at least one processor, wherein, to transmit the one or more FPC commands to the UE, the at least one processor is further configured to:
transmit, via the transceiver, the one or more FPC commands to the UE.

27. A method of wireless communication at a user equipment (UE), comprising:
receiving one or more frequency pre-compensation (FPC) commands from a non-terrestrial network (NTN) node;
adjusting a first total FPC adjustment to satisfy one or more threshold requirements, wherein the first total FPC adjustment is based on a current UE location update and a current UE velocity update; or
determining a second total FPC adjustment based on an intermediary UE location between the current UE location update and a previous UE location update and an intermediary UE velocity between the current UE velocity update and a previous UE velocity update; and
transmitting, in response to receiving the one or more FPC commands, an uplink transmission with a frequency change based on the adjusted first total FPC adjustment or the determined second total FPC adjustment.

28. A method of wireless communication at a non-terrestrial network (NTN) node, comprising:
transmitting one or more frequency pre-compensation (FPC) commands to a user equipment (UE); and
receiving, in response to transmitting the one or more FPC commands, an uplink transmission with a frequency change based on:
an adjustment of a first total FPC adjustment to satisfy one or more threshold requirements, wherein the first total FPC adjustment is based on a current UE location update and a current UE velocity update and, or
a determination of a second total FPC adjustment based on an intermediary UE location between the current UE location update and a previous UE location update and an intermediary UE velocity between the current UE velocity update and a previous UE velocity update.

29. The method of claim 28, wherein the adjustment of the first total FPC adjustment to satisfy the one or more threshold requirements comprises the adjustment of the first total FPC adjustment such that a transmission frequency error value satisfies the one or more threshold requirements, wherein the one or more threshold requirements comprise at least one of:

a maximum amount of magnitude of the transmission frequency error value for a single adjustment for the uplink transmission, other than an FPC adjustment based on an NTN node location update and an NTN node velocity update, that does not exceed a first threshold value;

a minimum aggregate adjustment rate of a first sum of the transmission frequency error value, other than the FPC adjustment based on the NTN node location update and the NTN node velocity update, and a first set of FPC adjustments, other than FPC adjustments based on NTN node location updates and NTN node velocity updates, over a first period of time that meets or exceeds a second threshold value, or a maximum aggregate adjustment rate of a second sum of the transmission frequency error value, other than the FPC adjustment based on the NTN node location update and the NTN node velocity update, and a second set of FPC adjustments, other than the FPC adjustments based on the NTN node location updates and the NTN node velocity updates, over a second period of time that meets or does not exceed a third threshold value.

* * * * *